(12) United States Patent
Hirota

(10) Patent No.: US 9,285,051 B2
(45) Date of Patent: Mar. 15, 2016

(54) CONTROL VALVE DRIVEN BY STEPPING MOTOR

(71) Applicant: TGK CO., LTD, Toyko (JP)

(72) Inventor: Hisatoshi Hirota, Tokyo (JP)

(73) Assignee: TGK CO., LTD., Tokyo (JP)

( * ) Notice: Subject to any disclaimer, the term of this patent is extended or adjusted under 35 U.S.C. 154(b) by 112 days.

(21) Appl. No.: 13/897,338

(22) Filed: May 17, 2013

(65) Prior Publication Data

US 2013/0263955 A1    Oct. 10, 2013

(30) Foreign Application Priority Data

Nov. 18, 2010   (JP) .................................. 2010-257431
Oct. 7, 2011   (WO) .................. PCT/JP2011/005662

(51) Int. Cl.
| | |
|---|---|
| *F16K 31/02* | (2006.01) |
| *F16K 31/04* | (2006.01) |
| *F16K 11/10* | (2006.01) |
| *F25B 41/04* | (2006.01) |

(52) U.S. Cl.
CPC .................. *F16K 31/04* (2013.01); *F16K 11/10* (2013.01); *F25B 41/04* (2013.01); *Y10T 137/86895* (2015.04); *Y10T 137/87056* (2015.04)

(58) Field of Classification Search
CPC ....... F16K 11/044; F16K 11/14; F16K 11/18; F16K 31/04; Y10T 137/86895
USPC ...................... 137/625.5, 636, 867, 870, 883; 251/129.11, 129.12
See application file for complete search history.

(56) References Cited

U.S. PATENT DOCUMENTS

| 2,457,739 | A | * | 12/1948 | Sherrill | ..................... | 123/179.12 |
| 8,556,229 | B2 | * | 10/2013 | Lv et al. | .................... | 251/129.11 |
| 2006/0273272 | A1 | * | 12/2006 | Uchida et al. | ............ | 251/129.11 |

FOREIGN PATENT DOCUMENTS

| JP | 05-965 | | 1/1993 | ............. F02M 69/32 |
| JP | 05-61508 | * | 6/1993 | |
| JP | 08-021554 | | 1/1996 | .............. F16K 31/04 |
| JP | 08226564 | A * | 9/1996 | .............. F16K 31/04 |
| JP | 09-257147 | | 9/1997 | .............. F16K 31/04 |
| JP | 2005-003190 | | 1/2005 | ............ F16K 11/044 |

(Continued)

OTHER PUBLICATIONS

English Translation of Naoya et al. (JP 05-61508). Jun. 1993.*

(Continued)

*Primary Examiner* — Robert K. Arundale
(74) *Attorney, Agent, or Firm* — Martine Penilla Group, LLP

(57) ABSTRACT

A control valve includes: a body having valve holes for communicating an inlet port and the outlet ports together, respectively; valve elements for opening and closing valve sections by contacting and leaving the valve holes, respectively; a stepping motor having a rotor for driving the valve elements in the opening and closing directions of the valve sections; and a valve actuating member that drives the valve elements in the opening and closing directions of the valve sections by converting a rotational movement of the rotor around the axis line thereof into a translational movement of the valve actuating member in the axis line direction. The valve actuating member is supported by the rotor so as to be capable of making a translational movement of the valve actuating member in the axial direction with respect to the rotor, while a rotational movement with respect to the rotor is regulated.

8 Claims, 15 Drawing Sheets

(56) References Cited

FOREIGN PATENT DOCUMENTS

| | | | |
|---|---|---|---|
| JP | 2008-232290 | 10/2008 | ................ F16K 1/34 |
| JP | 2010-038336 | 2/2010 | ............ F16K 11/044 |

OTHER PUBLICATIONS

Japanese Notification of Reason(s) for Refusal, Ref. TGK10-128, Disptach No. 411619, Aug. 5, 2014.

* cited by examiner

CONTROL VALVE DRIVEN BY STEPPING MOTOR

CLAIM OF PRIORITY TO RELATED APPLICATION

This application claims priority under 35 U.S.C. §120 and 365 (c) as a continuation of prior International Application No. PCT/JP2011/005662, filed on Oct. 7, 2011, which further claims priority of Japanese Patent Application No. JP 2010-257431 filed on Nov. 18, 2010, the contents of which are incorporated herein by reference.

BACKGROUND OF THE INVENTION

1. Field of the Invention

The present invention relates to a control valve driven by a stepping motor, and in particular, to a control valve suitable for an automotive air conditioner.

2. Description of the Related Art

In a vehicle in which an internal-combustion engine is mounted, it recently becomes difficult that the temperature of the cooling water in the vehicle, which has been used as a heat source, is raised to the temperature necessary for heating the interior of the vehicle, partly because the combustion efficiency of the engine has been increased. On the other hand, in a hybrid vehicle in which an internal-combustion engine and an electric motor are used in combination, it is further difficult to use cooling water for such the purpose, because the working ratio of the internal-combustion engine is low. In an electric car, there is no heat source itself created by an internal-combustion engine. Accordingly, an automotive air conditioner driven by a heat pump is presented, which can dehumidify and heat the interior of a vehicle by performing a cycle operation in which a refrigerant is used for not only cooling but also heating.

Such an automotive air conditioner has a refrigeration cycle including a compressor, an external heat exchanger, an evaporator, and an internal heat exchanger, etc., and the function of the external heat exchanger is switched between a heating operation and a cooling operation. During the heating operation, the external heat exchanger functions as an evaporator. In the case, the internal heat exchanger radiates heat while a refrigerant is circulating the refrigeration cycle, the heat heating the air in the interior of a vehicle. On the other hand, during the cooling operation, the external heat exchanger functions as a condenser. In the case, the refrigerant condensed in the external heat exchanger evaporates in the evaporator, and latent heat of evaporation thus generated cools the air therein. At the time, the air is also dehumidified.

When a plurality of evaporators function in accordance with an operating state of a refrigeration cycle in this way, it is needed to adjust a ratio of a flow rate of a refrigerant flowing through each evaporator. The same is true with the case where a plurality of condensers function. Accordingly, a control valve, by which an opening degree of a valve can be electrically adjusted, is sometimes provided at a specific position in a refrigerant circulation passage; in general, however, an electromagnetic valve driven by a solenoid, by which a large drive force can be obtained at a relatively low cost, is often used. When it is needed to precisely control an opening degree of a valve, however, it is desirable to use a control valve driven by a stepping motor, as frequently seen in residential air conditioners (see, for example, Patent Documents 1 and 2). It is because a displacement amount of a valve element, and eventually an opening degree of a valve can be precisely adjusted by setting the number of steps (number of drive pluses).

PATENT DOCUMENT

[Patent Document 1] Japanese Patent Application Publication No. 1996-21554

[Patent Document 2] Japanese Utility Publication No. 1993-965

SUMMARY OF THE INVENTION

In the control valve described in, for example, Patent Document 1, however, opening and closing drive of the valve is accompanied by a translational movement of a rotor, and hence a stepping motor becomes large in size, thereby causing a problem in terms of the space of the motor to be installed in a vehicle. With respect to this point, the control valve described in Patent Document 2 has a structure in which a rotor and a valve element are connected together by a drive shaft and the valve element is driven for opening and closing a valve section by converting a rotational force of the rotor into a translational force of the drive shaft. Specifically, a rotational movement is converted into a translational movement by screw mechanisms in which a female thread portion is provided on an inner circumferential surface of the rotor and a male thread portion is provided on an outer circumferential surface of the drive shaft. Accordingly, it becomes possible to form the whole motor with a compact size. In such a structure, however, a reaction force in an axis line direction, which is to act from the valve element, acts on the rotor when the valve element is driven, and hence an expensive bearing is needed for suitably supporting the rotor in the axis line direction, thereby leaving the problem that cost is increased.

A purpose of the present invention is to form a control valve driven by a stepping motor with a compact size and to achieve the control valve at a low cost.

In order to solve the aforementioned problem, a control valve driven by a stepping motor according to an embodiment of the present invention comprises: a body including an inlet port for introducing a refrigerant from an upstream side, an outlet port for delivering the refrigerant toward a downstream side, and a valve hole for communicating the inlet port and the outlet port together; a valve element configured to open and close a valve section by contacting and leaving the valve hole; a stepping motor including a rotor for driving the valve element in directions in which the valve section is opened and closed; and a valve actuating member configured to rotate with the rotor and to drive the valve element in the directions in which the valve section is opened and closed by converting a rotational movement around an axis line of the rotor into a translational movement of the valve actuating member in the axis line direction. The valve actuating member is supported by the rotor so as to be capable of making a translational movement of the valve actuating member in the axis line direction with respect to the rotor, while a rotational movement with respect to the rotor is regulated.

According to this embodiment, a valve actuating member, configured to drive a valve element in directions in which a valve section is opened and closed by converting a rotational movement of a rotor into a translational movement of the valve actuating member, is provided, and hence a displacement in the axis line direction of the rotor is not caused and a stepping motor can be formed so as to have a compact size. Further, a translational movement of the valve actuating member in the axis line direction with respect to the rotor is allowed, while a rotational movement thereof with respect to the rotor is regulated. Thereby, it can be suppressed that a reaction force in the axis line direction, which is to act on the valve actuating member from the valve element side, may be transmitted to the rotor. As a result, it is not needed to separately provide an expensive bearing for supporting the rotor in the axis line direction, and hence a control valve can be manufactured at a low cost.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Hereinafter, preferred embodiments of the present invention will de described in detail with reference to the accompanying drawings.

[First Embodiment]

Figure 1:
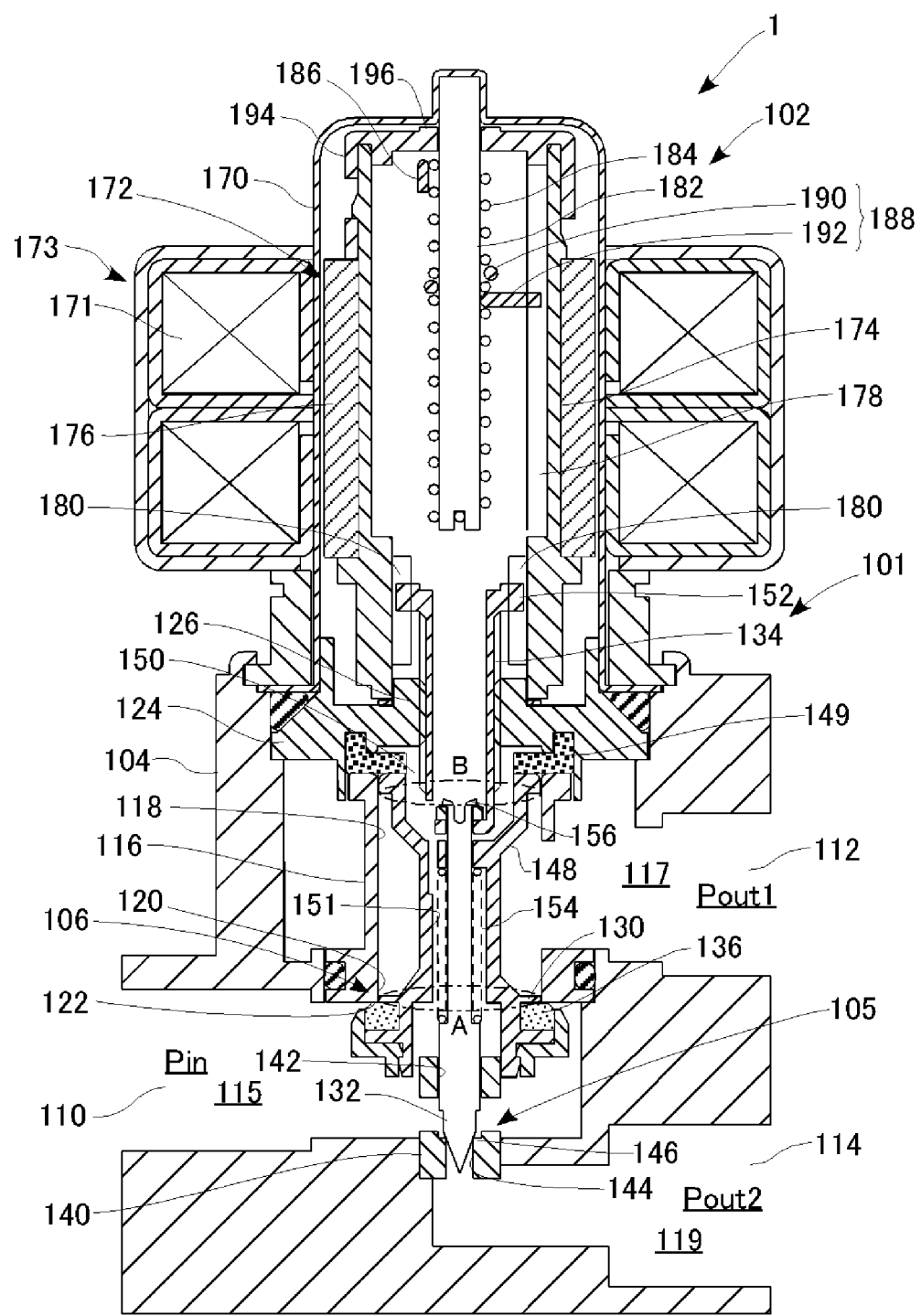
FIG. 1 is a sectional view illustrating a structure and an operation of a control valve according to First Embodiment.
Figure 2:
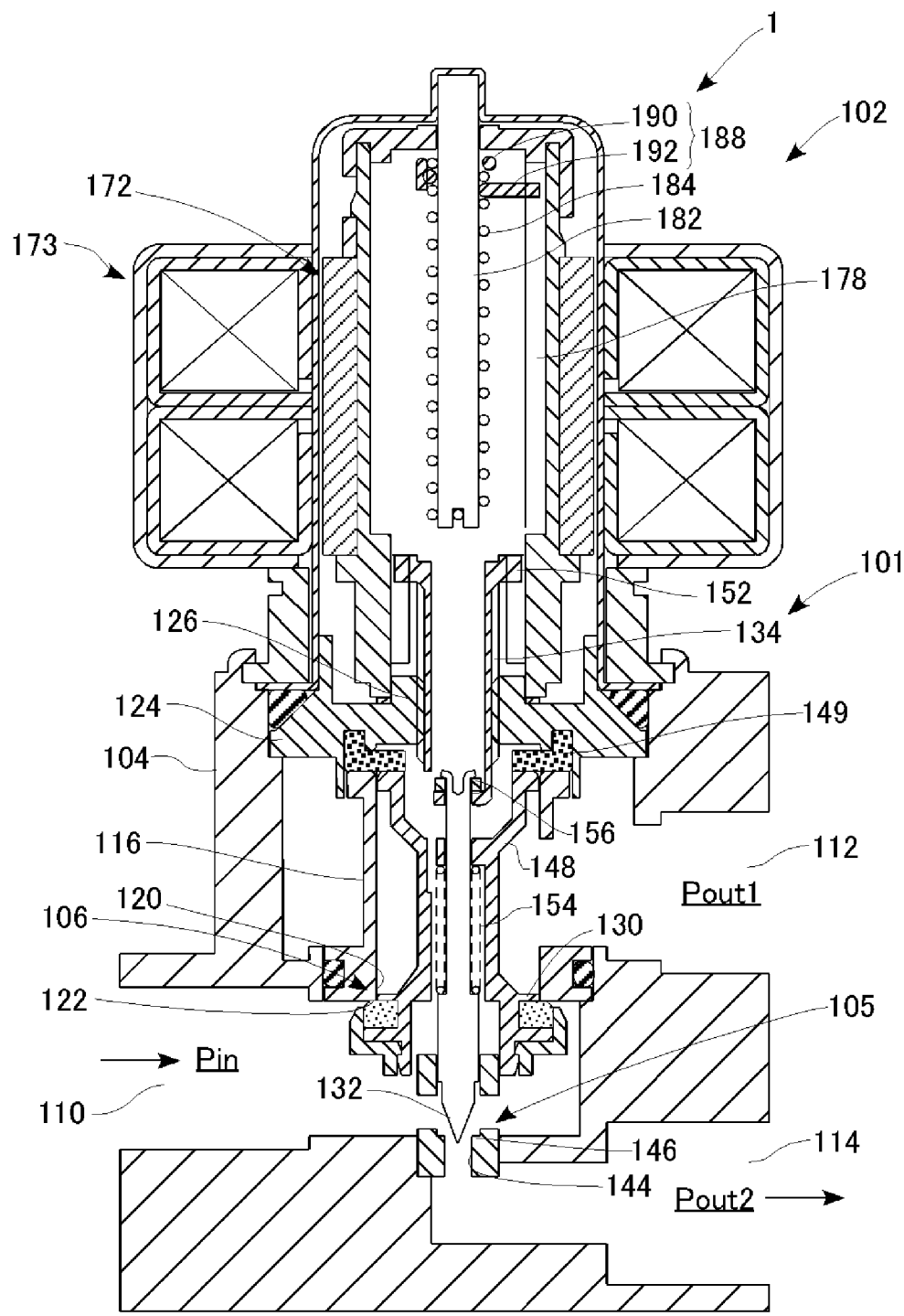
FIG. 2 is a sectional view illustrating the structure and an operation of the control valve according to First Embodiment.
Figure 3:
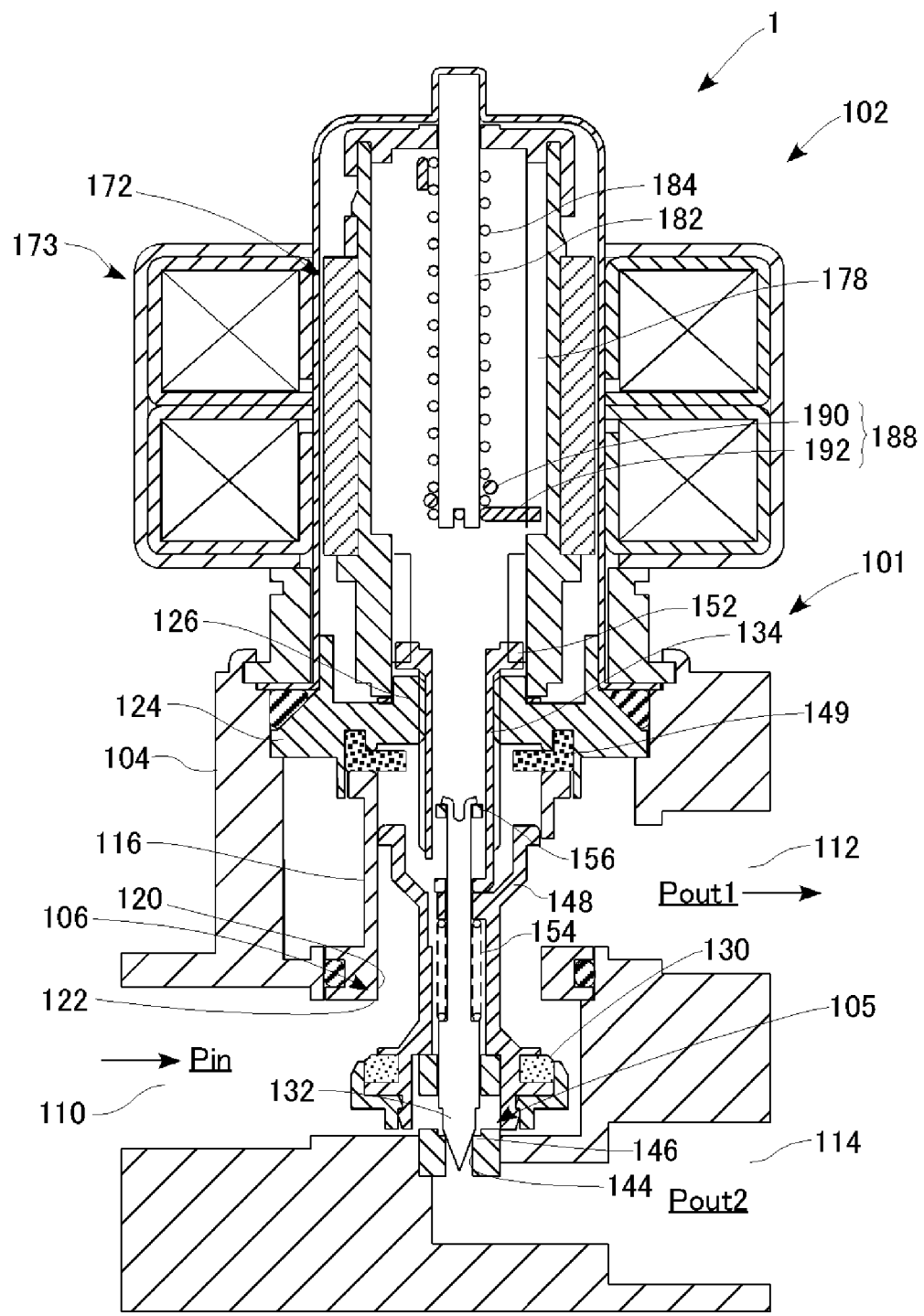
FIG. 3 is a sectional view illustrating the structure of an operation of the control valve according to First Embodiment.

First Embodiment of the present invention will be first described. FIGS. 1 to 3 are sectional views each illustrating a structure and an operation of a control valve according to First Embodiment. The control valve according to the present embodiment is considered to be applied to an air conditioner driven by a heat pump, which is to be mounted, for example, in an electric car.

That is, a refrigeration cycle (refrigerant circulation circuit), in which a compressor, an internal condenser, an external heat exchanger, an evaporator, and an accumulator, etc., are connected together by pipes, is provided in an automotive air conditioner, and air conditioning of a vehicle interior is performed by heat exchange occurring in a course through which a refrigerant circulates the refrigeration cycle while changing its states. Various control valves for appropriately controlling the air conditioning are arranged in the refrigerant circulation circuit, and a control valve 1 forms one of them.

The control valve 1 is provided at a branch point where an upstream passage branches off to a first downstream passage and a second downstream passage in order to adjust a flow rate of the refrigerant flowing from the upstream passage to each of the downstream passages. The control valve 1 is formed as a proportional valve whose opening degree is adjusted to a preset one. The control valve 1 is basically controlled so as to be in one state of a fully-opened state, a large aperture control state, a small aperture control state, and a valve-closed state. Herein, the large aperture control state means a state where the valve is not fully opened, but opened so as to have a large opening degree; and the small aperture control state means a state where the valve is opened so as to have a small opening degree, but not closed. The control valve 1 also functions as an expansion device by the small aperture control.

As illustrated in FIG. 1, the control valve 1 is formed as a motorized valve driven by a stepping motor, and is formed by assembling a valve main body 101 and a motor unit 102. The valve main body 101 is formed by coaxially housing, in a bottomed cylindrical body 104, a first valve 105 having a small aperture (which forms a "valve section") and a second valve 106 having a large aperture (which forms the "valve section").

An inlet port 110 is provided in one side portion of the body 104, and a first outlet port 112 and a second outlet port 114 are respectively provided in an upper portion and a lower portion of the other side portion thereof. The inlet port 110 communicates with the upstream passage, the first outlet port 112 communicates with the first downstream passage, and the second outlet port 114 communicates with the second downstream passage. That is, a first refrigerant passage that connects the first inlet port 110 and the first outlet port 112 together and a second refrigerant passage that connects the inlet port 110 and the second outlet port 114 together are formed in the body 104.

A cylindrical guide member 116 is arranged in an upper half portion of the body 104. The guide member 116 is concentrically attached to the body 104 via a sealing member. An inner circumferential surface of the upper half portion of the guide member 116 forms a guide hole 118, and a lower end portion thereof forms a valve hole 120. A valve seat 122 is formed by a lower end opening edge of the valve hole 120. A communication hole that communicates the inside and the outside of the guide member 116 together is provided on a surface of the guide member 116 that faces the first outlet port 112.

A disk-shaped partition member 124 is arranged at an upper end portion of the body 104. The partition member 124 partitions the inside of the valve main body 101 and the inside of the motor unit 102. A circular boss-shaped bearing part 126 is provided at a central portion of the partition member 124. A female thread portion is provided on an inner circumferential surface of the bearing part 126, and an outer circumferential surface thereof functions as a plain bearing.

A valve element 130 having a large diameter, a valve element 132 having a small diameter, and a valve actuating member 134 are coaxially arranged inside the body 104. A flow rate of the refrigerant flowing through the first refrigerant passage is adjusted by adjusting an opening degree of the second valve 106 having a large aperture with the valve element 130 moving toward and away from the valve hole 120 from the upstream side. A valve member 136 made of a ring-shaped elastic body (e.g., rubber) is fitted around an outer circumferential surface of the valve element 130, and hence it becomes possible to completely close the second valve 106 with the valve member 136 being seated on the valve seat 122.

On the other hand, a small cylinder-shaped guide member 140 is arranged in a lower half portion of the body 104. The guide member 140 is provided in a central portion of the second refrigerant passage so as to be coaxial with the valve element 130, the lower half portion of the guide member 140 being press-fitted into the body 104. An inner circumferential surface of an upper half portion of the guide member 140 forms a guide hole 142, and a lower end portion thereof forms a valve hole 144. A valve seat 146 is formed by an upper end opening edge of the valve hole 144. A communication hole that communicates the inside and the outside of the guide member 140 together is provided on a surface of the guide member 140 that faces the inlet port 110. As illustrated, a high-pressure chamber 115 that communicates with the inlet port 110 is formed on the upstream side of the valve holes 120 and 144, the high-pressure chamber 115 being common between the two valve holes 120 and 144; a low-pressure chamber 117 that communicates with the first outlet port 112 is formed on a downstream side of the valve hole 120; and a low-pressure chamber 119 that communicates with the second outlet port 114 is formed on a downstream side of the valve hole 144.

A partition part 148 is provided successively from the valve element 130 via a diameter-reduced part. The partition part 148 is arranged in the low-pressure chamber 117. A stable movement of the vale element 130, in the opening and closing directions thereof, is secured with an upper end portion of the partition part 148 being slidably supported by the guide hole 118. A back-pressure chamber 150 is formed between the partition part 148 and the partition member 124. In addition, a communication passage 151 penetrating the valve element 130 and the partition part 148 is formed, by which the high-pressure chamber 115 and the back-pressure chamber 150 communicate with each other. Thereby, the back-pressure chamber 150 is always filled with an upstream pressure $P_{in}$ introduced from the inlet port 110.

In the present embodiment, an effective diameter A of the valve hole 120 and an effective diameter B of the guide hole 118 are set to be equal to each other (an effective pressure-receiving area of the vale element 130 and that of the partition part 148 are set to be substantially equal to each other), and hence an influence of a refrigerant pressure, possibly acting on the valve element 130, is canceled. In particular, to strictly achieve the pressure cancellation, a receiving-pressure adjusting member 149, configured to enlarge the effective pressure-receiving area of the partition part 148 by closely contacting the partition part 148 when the second valve 106 is closed, is arranged above the partition part 148 in the back-pressure chamber 150. The receiving-pressure adjusting member 149 is made of a ring-shaped elastic body (e.g., rubber), and is supported with an outer periphery portion thereof being positioned between the guide member 116 and the partition member 124.

That is, the effective pressure-receiving area of the valve element 130 is set to correspond to the effective diameter A of the valve hole 120. However, in a complete sealing state where the valve member 136 is seated on the valve seat 122, an actual effective pressure-receiving diameter becomes slightly larger than the effective diameter A of the valve hole 120 due to the property of the elastic body. To deal with this, an effective pressure-receiving diameter on the back-pressure chamber 150 side is set to be slightly larger than the effective diameter B of the guide hole 118 by making the receiving-pressure adjusting member 149 to closely contact a bottom surface of the partition part 148 in the complete sealing state. Complete pressure cancellation is achieved with the effective pressure-receiving area of the valve element 130 and that of the partition part 148 being equal to each other in such a way.

The valve element 132 has a stepped cylinder shape and is arranged inside the valve element 130 to be coaxial therewith. A lower half portion of the valve element 132 is slidably inserted into the guide member 140 and a tip portion thereof is arranged to face the valve hole 144. On the other hand, an upper half portion of the valve element 132 penetrates the communication passage 151 in the valve element 130, and an upper end portion thereof is supported by the valve actuating member 134. The valve element 132 is formed as a so-called needle valve element, and the pointed tip portion thereof is inserted and extracted into/from the valve hole 144. The first valve 105 is opened and closed with the valve element 132 touching and leaving the valve seat 146. The upper end portion of the valve element 132 penetrates a bottom of the valve actuating member 134, and the tip portion thereof serves as a stopper 156 by being caulked outward.

The valve actuating member 134 has a stepped cylindrical shape, and a male thread portion is formed in an outer circumferential portion thereof. The male thread portion is screwed to a female thread portion of the bearing part 126. A plurality of leg portions 152 (four leg portions in the present embodiment), each extending radially outward, are provided at an upper end portion of the valve actuating member 134, which are fitted into a rotor in the motor unit 102. A spring 154 for biasing the valve element 132 in the valve-closing direction (which functions as a "biasing member") is interposed between the valve element 132 and the partition part 148. In a usual state, the valve element 132 is biased downward by the spring 154, as illustrated, while the stopper 156 of the valve element 132 is stopped by the upper end portion of the valve actuating member 134. Accordingly, the valve element 132 is in a state of being located in the lowest position with respect to the valve actuating member 134.

The valve actuating member 134 rotates when receiving a rotational drive force of the motor unit 102, and converts the rotational drive force into a translational force. That is, when the valve actuating member 134 rotates, the valve actuating member 134 is displaced in the axis line direction by a screw mechanism (which functions as an "actuation conversion mechanism"), thereby making the valve element 132 to be driven in the opening and closing directions. When the first valve 105 is opened, the valve element 132 and the valve actuating member 134 work integrally with each other.

On the other hand, the motor unit 102 is formed as a stepping motor including a rotor 172 and a stator 173. The motor unit 102 is formed in such a way that the rotor 172 is rotatably supported inside a sleeve 170 having a bottomed cylindrical shape. The stator 173, in which an exciting coil 171 is housed, is provided at an outer circumference of the sleeve 170. A lower end opening portion of the sleeve 170 is assembled to the body 104, and the sleeve 170 and the body 104 form the body of the control valve 1.

The rotor 172 includes: a rotating shaft 174 formed into a cylindrical shape; and a magnet 176 arranged at an outer circumference of the rotating shaft 174. In the present embodiment, the magnet 176 is magnetized with 24 poles. An internal space, extending across almost the total length of the motor unit 102, is formed inside the rotating shaft 174. A guide part 178, extending parallel to the axis line, is provided at a particular position on an inner circumferential surface of the rotating shaft 174. The guide part 178 forms a projecting part for being engaged with the later-described rotation stopper, and is formed by one protrusion extending parallel to the axis line.

A lower end portion of the rotating shaft 174 is slightly reduced in diameter, and four guide parts 180, each extending parallel to the axis line, are provided on the inner circumferential surface of the shaft 174. Each of the guide parts 180 is formed by a pair of protrusions each extending parallel to the axis line, and is provided, at a position 90° away from the adjacent guide part 180, on the inner circumferential surface of the rotating shaft 174. The aforementioned four leg portions 152 of the valve actuating member 134 are fitted into these four guide parts 180, so that the rotor 172 and the valve actuating member 134 can rotate integrally with each other. However, a displacement of the valve actuating member 134, occurring in the axis line direction along the guide parts 180, is allowed, while a relative displacement thereof, occurring in the rotating direction with respect to the rotor 172, is regulated. That is, the valve actuating member 134 is driven in the opening and closing directions of the valve element 132, while rotating with the rotor 172.

A lengthy shaft 182 is arranged inside the rotor 172 and along the axis line thereof. The shaft 182 is fixed in a cantilevered manner with an upper end portion thereof being press-fitted into a bottom center of the sleeve 170, and extends parallel to the guide part 178 in the internal space of the rotor 172. The shaft 182 is arranged on the same axis line as that of the valve actuating member 134. A guide part 184 having a spiral shape, extending across almost the total length of the shaft 182, is provided in the shaft 182. The guide part 184 is made of a coil-shaped member and is fitted around an outer surface of the shaft 182. An upper end portion of the guide part 184 is folded back to serve as a stopper 186.

A rotation stopper 188 having a spiral shape is rotatably engaged with the guide part 184. The rotation stopper 188 has both an engagement part 190 having a spiral shape, which is engaged with the guide part 184, and a power transmission part 192 supported by the rotating shaft 174. The engagement part 190 has a shape of a single-turn coil, and the power transmission part 192, extending radially outward, is successively provided in a lower end portion of the engagement part 190. A tip portion of the power transmission part 192 is engaged with the guide part 178. That is, the power transmission part 192 is stopped by contacting one of the protrusions of the guide part 178. Accordingly, a displacement of the rotation stopper 188, occurring in the axis line direction while sliding on the guide part 178, is allowed, while a relative displacement thereof, occurring in the rotating direction, is regulated by the rotating shaft 174.

That is, the rotation stopper 188 is driven in the axis line direction by rotating integrally with the rotor 172 and with the engagement part 190 thereof being guided along the guide part 184. However, a range in which the rotation stopper 188 is driven in the axis line direction is regulated by stoppers formed on both ends of the guide part 178. In the view, a state where the rotation stopper 188 is located at an intermediate position is illustrated. When the rotation stopper 188 is displaced upward and stopped by the stopper 186, the position becomes a top dead center. When the rotation stopper 188 is displaced downward, it is stopped at a bottom dead center.

An upper end portion of the rotor 172 is rotatably supported by the shaft 182, and a lower end portion thereof is rotatably supported the bearing part 126. Specifically, an end portion member 194 having a bottomed cylindrical shape is provided so as to seal an upper end opening portion of the rotating shaft 174, and a portion of a cylindrical shaft 196, provided at a center of the end portion member 194, is supported by the shaft 182. That is, the bearing part 126 serves as a bearing part on one end side, and a sliding portion of the shaft 182 with the cylindrical shaft 196 serves as a bearing part on the other end side.

The control valve 1 structured as stated above functions as a control valve operated by a stepping motor, the opening degree of which can be adjusted by drive control of the motor unit 102. Hereinafter, movements thereof will be described in detail. In the flow rate control of the control valve 1, a non-illustrated controller in the automotive air conditioner calculates the number of driving steps of the stepping motor in accordance with a preset opening degree, and supplies a drive current (drive pulse) to the exciting coil 171. Thereby, the rotor 172 rotates, and on one hand, an opening degree of each of the first valve 105 having a small aperture and the second valve 106 having a large aperture is adjusted to the preset opening degree with the valve actuating member 134 being rotationally driven; and on the other hand, the rotation stopper 188 is driven along the guide part 184, thereby allowing a range in which each of the valve elements moves to be regulated.

Specifically, when the small aperture control is performed, the valve element 132 is displaced in the valve-opening direction with the rotor 172 being rotationally driven in one direction from the state illustrated in FIG. 1 (normal rotation), thereby making the first valve 105 to be opened, as illustrated in FIG. 2. That is, the valve actuating member 134 that rotates with the rotor 172 is lifted by the screw mechanism, so that the stopper 156 is raised, thereby making the valve element 132 to be displaced in the valve-opening direction. The valve element 132 is driven within a range between the fully-closed state illustrated in FIG. 1 and the fully-opened state illustrated in FIG. 2, thereby allowing an opening degree of the first valve 105 to be adjusted.

When the large aperture control is performed, the valve element 132 is displaced in the valve-closing direction with the rotor 172 being rotationally driven in the other direction from the state illustrated in FIG. 1 (reverse rotation), thereby making the second valve 106 to be opened, as illustrated in FIG. 3. That is, the valve actuating member 134 that rotates with the rotor 172 contacts the partition part 148, so that the partition part 148 is lowered, thereby making the valve element 130 to be displaced in the valve-opening direction. The valve element 130 is driven within a range between the fully-closed state illustrated in FIG. 1 and the fully-opened state illustrated in FIG. 3, thereby allowing an opening degree of the second valve 106 to be adjusted. At the time, an engaged state between the stopper 156 of the valve element 132 and the bottom of the valve actuating member 134 is released, as illustrated, and hence no excessive pressing force acts between the valve element 132 and the valve seat 146.

Because the number of rotations of the rotor 172 corresponds to the number of drive steps as a control command value, the non-illustrated controller can control the control valve 1 so as to have an arbitrary opening degree. In the present embodiment, each valve element makes a stroke of 0.5 mm per one rotation of the rotor 172. Because the valve element 132 is always biased in the valve-closing direction by the spring 154, a valve-closed state of the first valve 105, in which the valve element 132 is seated on the valve seat 146, can be maintained in a valve-opened state of the second valve 106, in which the valve element 130 is spaced apart from the valve seat 122.

[Second Embodiment]

Figure 4:
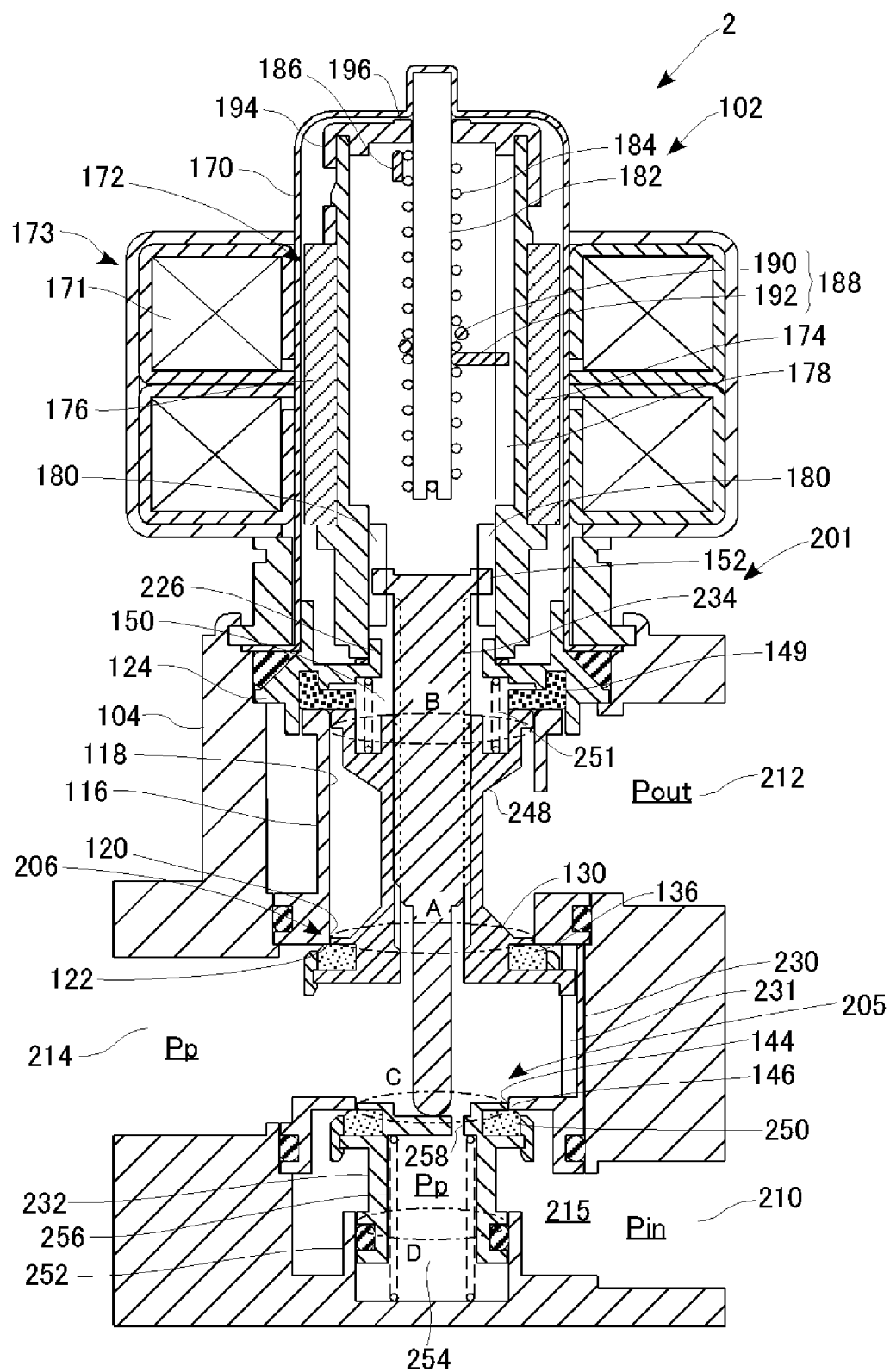
FIG. 4 is a sectional view illustrating a structure and an operation of a control valve according to Second Embodiment.
Figure 5:
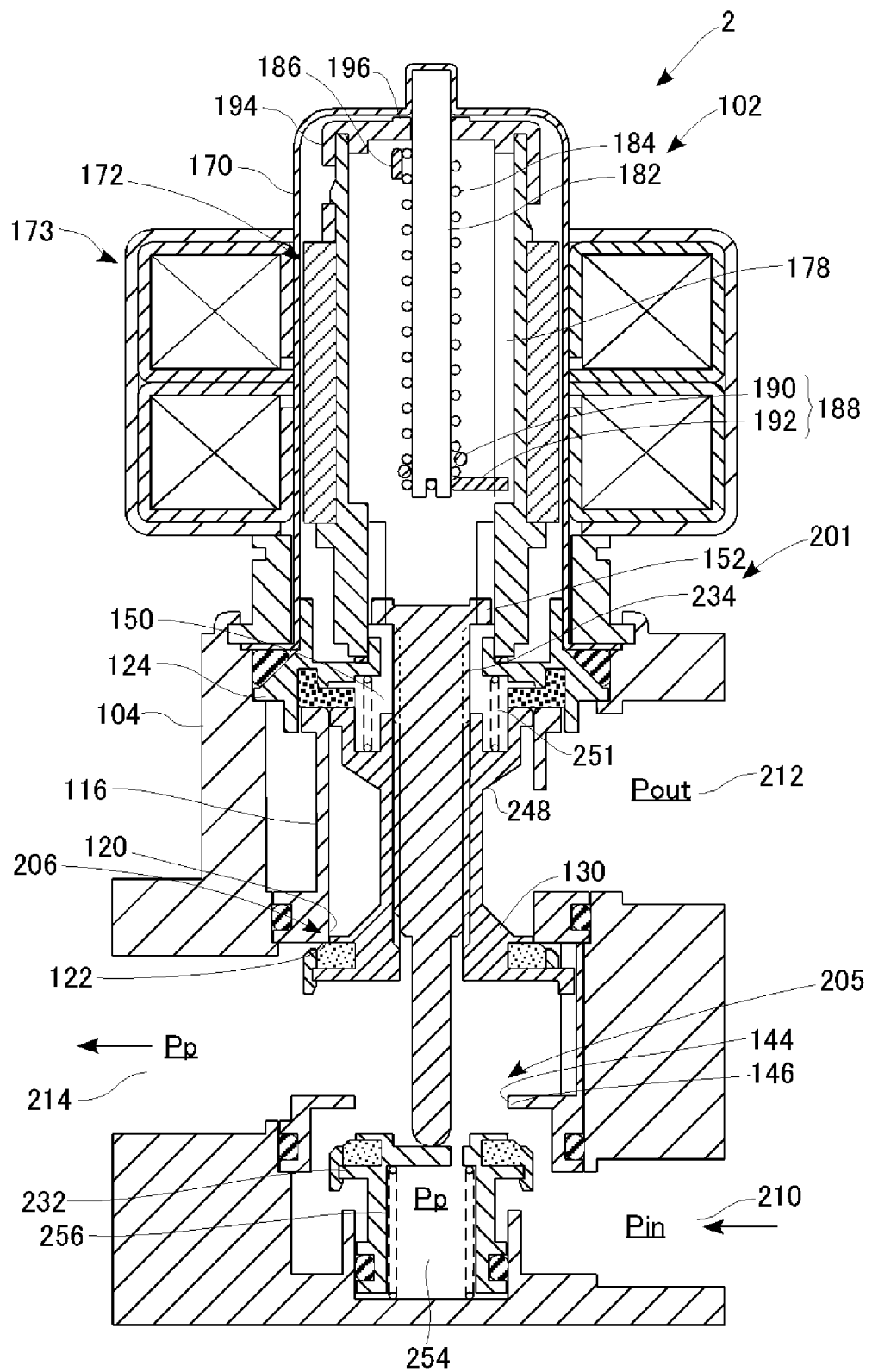
FIG. 5 is a sectional view illustrating the structure and an operation of the control valve according to Second Embodiment.
Figure 6:
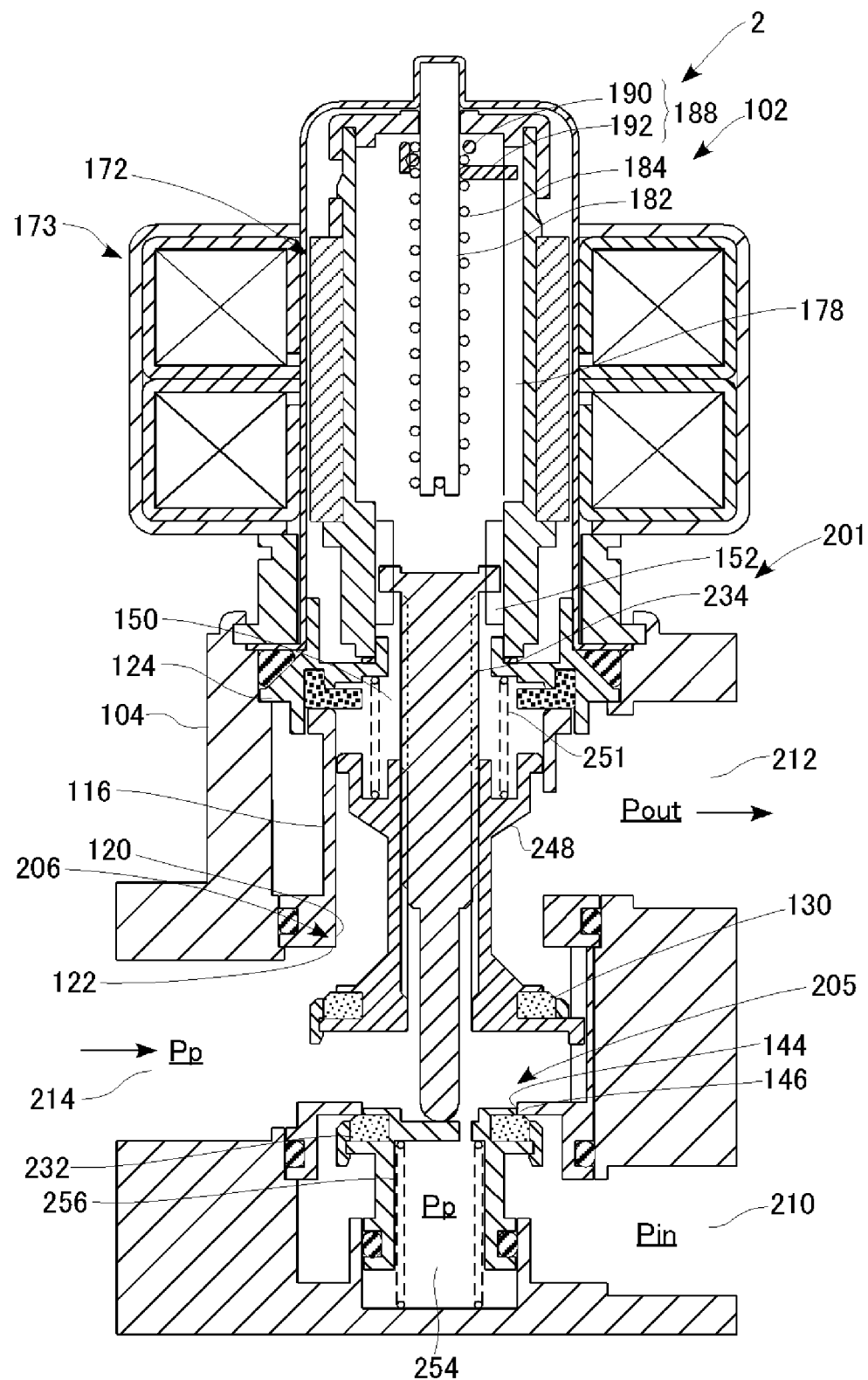
FIG. 6 is a sectional view illustrating the structure and an operation of the control valve according to Second Embodiment.

Subsequently, Second Embodiment of the present invention will be described. A control valve according to the present embodiment is different from that of First Embodiment with respect to the structure of a valve mechanism, etc., but has the structures of other parts the same as those of the control valve of First Embodiment. Accordingly, parts having structures almost similar to those in First Embodiment will be denoted with like reference numerals, and descriptions thereof will be appropriately omitted. FIGS. 4 to 6 are sectional views each illustrating a structure and an operation of the control valve according to Second Embodiment.

The control valve 2 is provided at a connection point where a first passage, a second passage, and a third passage, which form the refrigerant circulation passage, are connected together, so that a flow of the refrigerant flowing through each of the passages is switched and a flow rate thereof is adjusted. In the present embodiment, the first passage serves as an upstream passage, the third passage serves as a downstream passage, and the second passage is a commonly-used passage that serves as an upstream passage or a downstream passage in accordance with an operating state of the automotive air conditioner. The control valve 2 has a first valve 205 (which forms a "valve section") and a second valve 206 (which forms the "valve section"), and is formed as a proportional valve in which, when one of the above two valves is closed, an opening degree of the other valve is adjusted to a preset one. However, there is no difference in size between the first valve 205 and the second valve 206, the difference being seen in First Embodiment, and the control valve 2 is basically controlled so as to be in one state of a state where the first valve 205 is controlled, a state where the second valve 206 is controlled, and a valve-closed state.

As illustrated in FIG. 4, the control valve 2 is formed by assembling a valve main body 201 and the motor unit 102. The valve main body 201 is formed by coaxially housing the first valve 205 and the second valve 206 in the body 104. An inlet port 210 and an outlet port 212 are provided in one side portion of the body 104, and an inlet/outlet port 214 is provided in the other side portion thereof. The inlet port 210 communicates with the first passage, the inlet/outlet port 214 communicates with the second passage, and the outlet port 212 communicates with the third passage. Either a first refrigerant passage that connects the inlet port 210 and the inlet/outlet port 214 together or a second refrigerant passage that connects the inlet/outlet port 214 and the outlet port 212 together is formed in the body 104 in accordance with an operation state of the automotive air conditioner.

The valve element 130, a valve element 232, and a valve actuating member 234 are coaxially arranged inside the body 104. In the present embodiment, an outer circumferential surface of a bearing part 226 in the partition member 124 functions as a plain bearing, but a female thread portion, as in First Embodiment, is not provided on an inner circumferential surface of the bearing part 226. On the other hand, a female thread portion is provided on an inner circumferential surface of a partition part 248. A male thread portion is formed on an outer circumferential surface of an upper half portion of the valve actuating member 234, which is screwed to the female thread portion of the partition part 248. A lower half portion of the valve actuating member 234 extends under the valve element 130, and the member 234 is connected in such a way that a tip thereof contacts the valve element 232. A spring 251 for biasing the valve element 130 in the valve-opening direction (which functions as a "biasing member") is interposed between the partition part 248 and the partition member 124.

A partition member 230 having a stepped cylindrical shape is arranged in a lower half portion of the body 104. The partition member 230 is concentrically attached to the body 104 via a sealing member. A protrusion 231 parallel to the axis line is provided on an inner circumferential surface of the partition member 230, so that leg portions provided in a lower end outer circumferential portion of the valve element 130 are stopped in the rotating direction. That is, the protrusion 231 serves as a baffle for the valve element 130. A flange portion extending radially inward is formed in a lower portion of the partition member 230, and the valve hole 144 is formed by an inner circumferential portion of the flange portion. Also, the valve seat 146 is formed by a lower end opening edge of the valve hole 144. A communication hole that communicates the inside and the outside of the partition member 230 together is provided on a surface of the partition member 230 that faces the inlet/outlet port 214.

The valve element 232 is arranged in a pressure chamber 215 between the valve hole 144 and the inlet port 210 such that an opening degree of the first valve 205 is adjusted by moving toward and away from the valve hole 144 from the upstream side.

The valve element 232 has a bottomed cylindrical shape, and a valve member 250 made of a ring-shaped elastic body (e.g., rubber) is fitted around an outer circumferential surface at an upper end portion of the valve element 232. It becomes possible to completely close the first valve 205 with the valve member 250 being seated on the valve seat 146. A circular boss-shaped guide part 252 is formed to be coaxially with the valve hole 144 in the pressure chamber 215. A lower end portion of the valve element 232 is slidably inserted into the guide part 252 via a sealing member. A back-pressure chamber 254 is formed by a space enclosed by the valve element 232 and the guide part 252. A spring 256 for biasing the valve element 232 in the valve-closing direction (which functions as a "biasing member") is interposed between the valve element 232 and the body 104.

The valve actuating member 234 contacts an upper bottom of the valve element 232. Because a communication hole 258 that communicates the inlet/outlet port 214 and the back-pressure chamber 254 together is provided in the upper bottom, the back-pressure chamber 254 is filled with an intermediate pressure $P_p$ introduced or delivered from the inlet/outlet port 214. Herein, an effective diameter C of the valve hole 144 and an effective diameter D of the guide part 252 are set to be equal to each other in the present embodiment, and hence an influence of a refrigerant pressure, possibly acting on the valve element 232, is canceled. An influence of a refrigerant pressure, possibly acting on the valve element 130, is also canceled in the same way as in First Embodiment.

The control valve 2 structured as stated above functions as a control valve operated by a stepping motor, the opening degree of which can be adjusted by drive control of the motor unit 102. That is, when the first refrigerant passage is intended to be opened in accordance with an operation state of the automotive air conditioner, the valve actuating member 234 is displaced relatively downward with respect to the valve element 130 with the rotor 172 being rotationally driven in one direction from the state illustrated in FIG. 4 (normal rotation). At the time, the valve element 130 is in a state in which it cannot be displaced upward because the second valve 206 is closed with the valve element 130 being seated on the valve seat 122, and hence the valve actuating member 234 is displaced downward, thereby making the valve element 232 to be lowered in the valve-opening direction. The valve element 232 is driven within a range between the fully-closed state illustrated in FIG. 4 and the fully-opened state illustrated in FIG. 5, thereby allowing an opening degree of the first valve 205 to be adjusted. As a result, the refrigerant introduced from the inlet port 210 is delivered from the inlet/outlet port 214 after passing through the first valve 205.

In addition, when the second refrigerant passage is intended to be opened in accordance with an operation state of the automotive air conditioner, the valve actuating member 234 is displaced relatively upward with respect to the valve element 130 with the rotor 172 being rotationally driven in the other direction from the state illustrated in FIG. 4 (reverse rotation). At the time, a state in which the valve element 232 is seated on the valve seat 146 by the biasing force of the spring 256, that is, a valve-closed state of the first valve 205 is maintained. On the other hand, the valve actuating member 234 is displaced in a direction in which the member 234 is spaced apart from the valve element 130, and hence a load of the spring 251, which is balanced with that of the spring 256, is relieved, thereby making the spring 251 to be elongated. As a result, the valve element 130 is displaced downward. The valve element 130 is driven within a range between the fully-closed state illustrated in FIG. 4 and the fully-opened state illustrated in FIG. 6, thereby allowing an opening degree of the second valve 206 to be adjusted.

[Third Embodiment]

Figure 7:
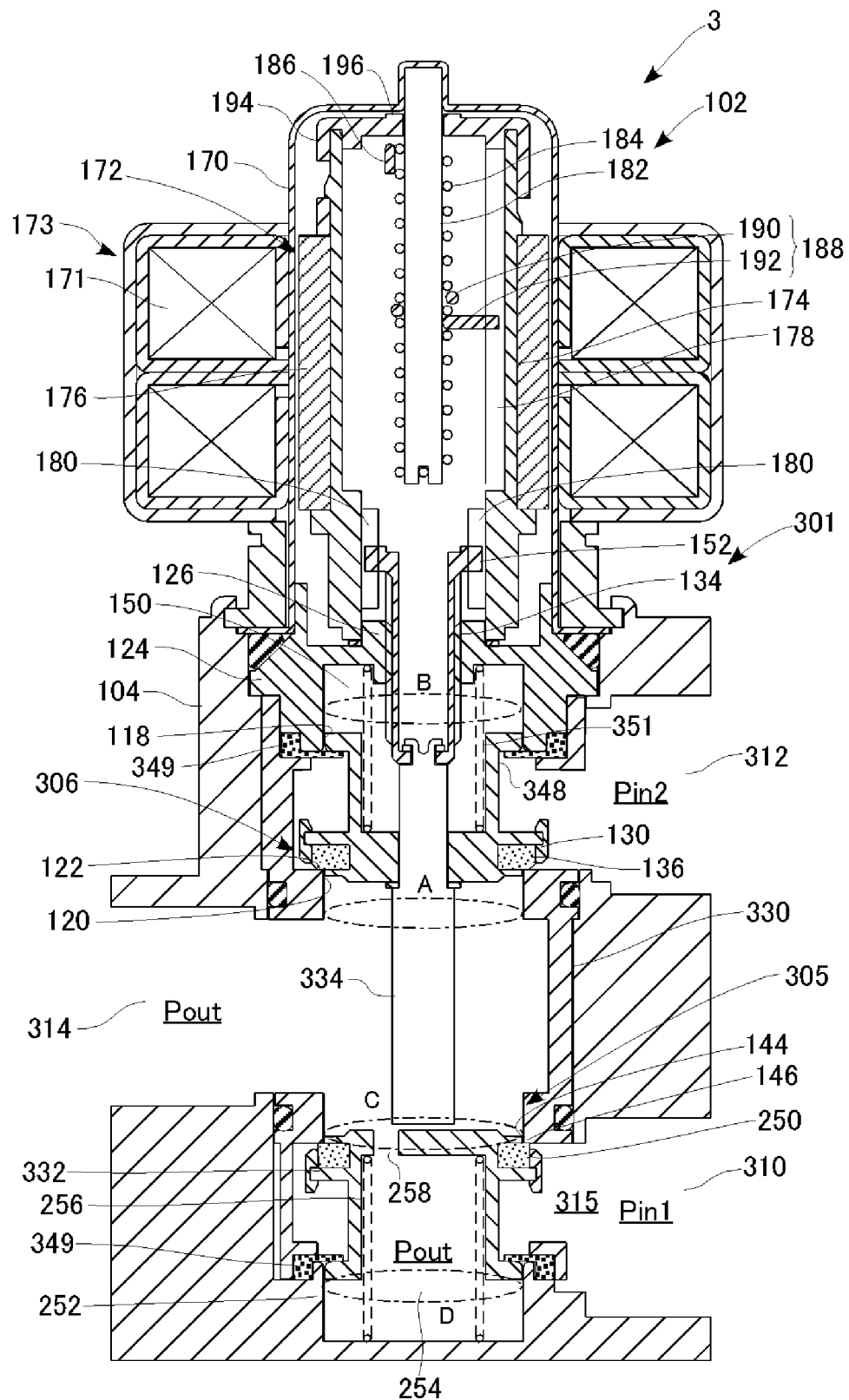
FIG. 7 is a sectional view illustrating a structure of an operation of a control valve according to Third Embodiment.
Figure 8:
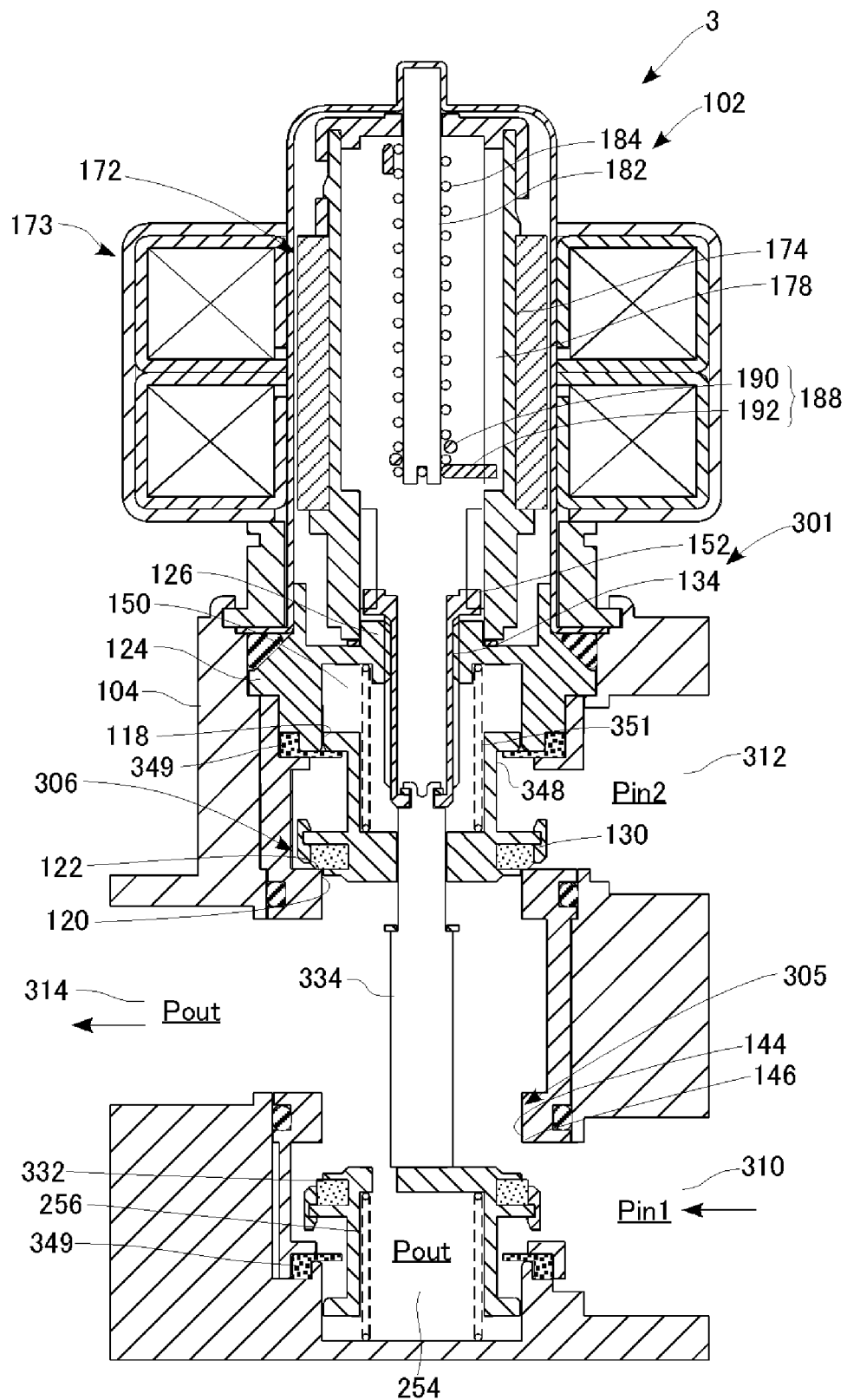
FIG. 8 is a sectional view illustrating the structure of an operation of the control valve according to Third Embodiment.
Figure 9:
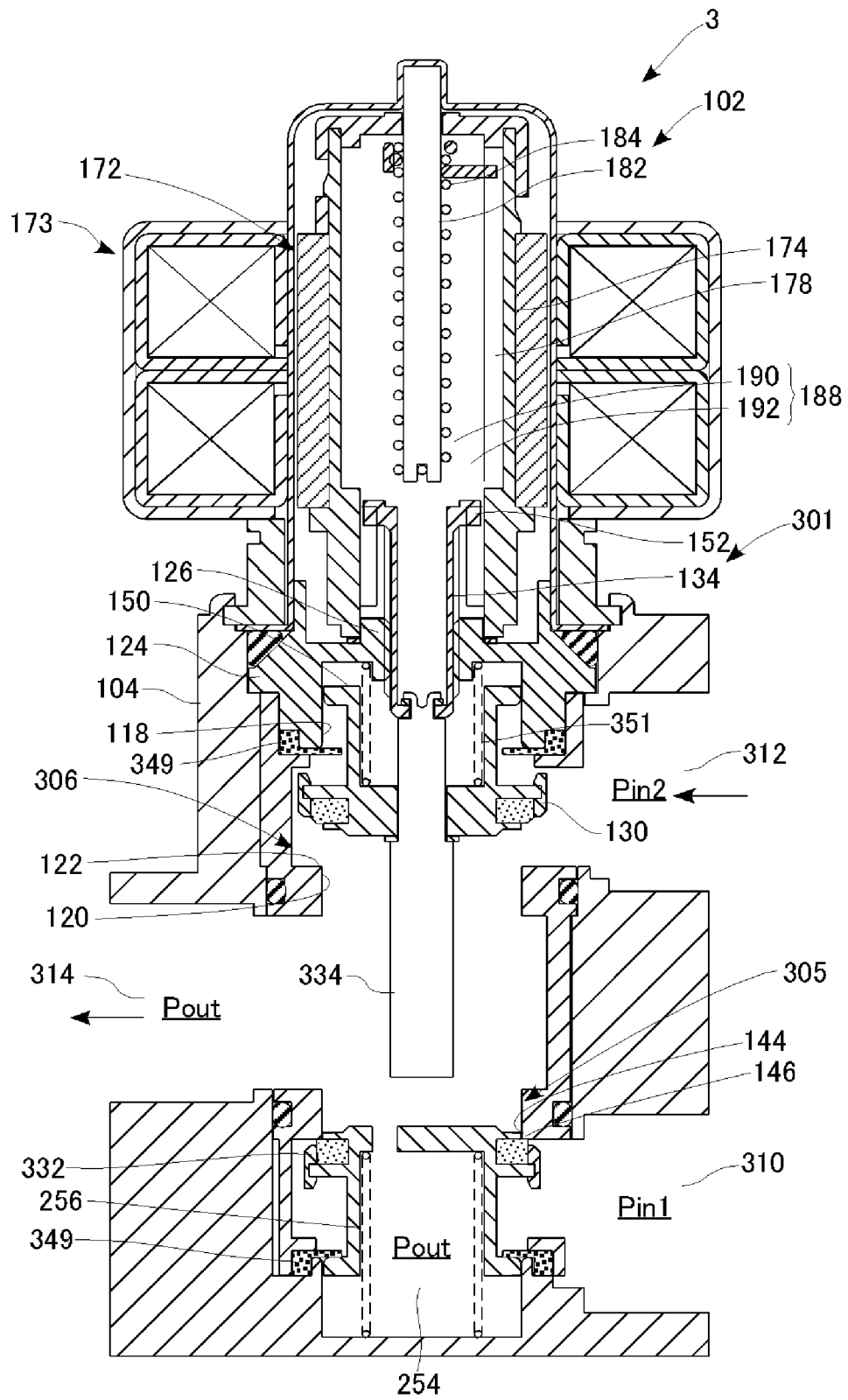
FIG. 9 is a sectional view illustrating the structure and an operation of the control valve according to Third Embodiment.

Subsequently, Third Embodiment of the present invention will be described. A control valve according to the present embodiment is different from those of First Embodiment and Second Embodiment with respect to the structure of a valve mechanism, etc., but has the structures of other parts the same as those of the control valves of First Embodiment and Second Embodiment. Accordingly, parts having structures almost similar to those in First Embodiment and Second Embodiment will be denoted with like reference numerals, and descriptions thereof will be appropriately omitted. FIGS. 7 to 9 are sectional views each illustrating a structure and an operation of the control valve according to Third Embodiment.

The control valve 3 is provided at a connection point where a first upstream passage, a second upstream passage, and a downstream passage, which form the refrigerant circulation passage, are connected together, so that a flow of a refrigerant flowing through each of the passages is switched and a flow rate thereof is adjusted. The control valve 3 has a first valve 305 and a second valve 306, and is formed as a proportional valve in which, when one of the above two valves is closed, an opening degree of the other valve is adjusted to a preset one.

As illustrated in FIG. 7, the control valve 3 is formed by assembling a valve main body 301 and the motor unit 102. The valve main body 301 is formed by coaxially housing the first valve 305 and the second valve 306 in the body 104. An inlet port 310 and a second inlet port 312 are provided in one side portion of the body 104, and an outlet port 314 is provided in the other side portion thereof. The first inlet port 310 communicates with the first upstream passage, the second inlet port 312 communicates with the second upstream passage, and the outlet port 314 communicates with the downstream passage. Either a first refrigerant passage that connects the first inlet port 310 and the outlet port 314 together or a second refrigerant passage that connects the second inlet port 312 and the outlet port 314 together is formed in the body 104 in accordance with an operation state of the automotive air conditioner.

A partition member 330 having a stepped cylindrical shape is inserted into the body 104. The partition member 330 is concentrically attached to the body 104 via a sealing member. The valve hole 120 is formed in an upper half portion of the partition member 330, and the valve hole 144 is formed in a lower half portion thereof. The valve element 130, a valve element 332, the valve actuating member 134, and a transmission rod 334 are coaxially arranged inside the body 104. A female thread portion is provided on an inner circumferential surface of the bearing part 226 in the partition member 124 in the same way as in First Embodiment. The transmission rod 334 is connected to the lower end portion of the valve actuating member 134. The transmission rod 334 has a stepped cylinder shape and penetrates the central portion of the valve element 130 in the axis line direction. An upper end portion of the transmission rod 334 is fixed to the bottom of the valve actuating member 134. A lower half portion of the transmission rod 334 is increased in diameter, and a stepped portion thereof serves as a stopper for regulating a relative displacement with the valve element 130.

The guide hole 118 is formed inside the partition member 124. An upper end portion of a partition part 348 provided successively from the valve element 130 is slidably supported by the guide hole 118. The back-pressure chamber 150 is formed by a space enclosed by the partition member 124 and the partition part 348. Because a predetermined clearance is present between the transmission rod 334 and the valve element 130, a downstream pressure $P_{out}$ on the downstream side of the valve hole 120 is introduced into the back-pressure chamber 150 via the clearance.

A spring 351 for biasing the valve element 130 in the valve-closing direction (which functions as a "biasing member") is interposed between the partition member 124 and the valve element 130. A received-pressure adjusting member 349 is arranged between the partition members 124 and 330. The received-pressure adjusting member 349 is formed into a thin film shape and contacts the partition part 348 from the downside, different from the received-pressure adjusting member 149 in First Embodiment.

The valve element 332 is arranged in a pressure chamber 315 between the valve hole 144 and the first inlet port 310, and adjusts an opening degree of the first valve 305 by moving toward and away from the valve hole 144 from the upstream side. The valve element 332 has a structure approximate to that of the valve element 232 in Second Embodiment. The back-pressure chamber 254 is formed between the valve element 332 and the guide part 252, into which a downstream pressure $P_{out}$ is introduced. The received-pressure adjusting member 349 is also arranged between a lower end portion of the partition member 330 and the body 104. The received-pressure adjusting member 349 contacts a lower end portion of the valve element 332 from the upside.

Herein, the effective diameter C of the valve hole 144 and the effective diameter D of the guide part 252 are also set to be equal to each other in the present embodiment, and the effective diameter A of the valve hole 120 and the effective diameter B of the guide hole 118 are set to be equal to each other. Accordingly, influences of a refrigerant pressure, possibly acting on the valve elements 130 and 232, are canceled.

The control valve 3 structured as stated above functions as a control valve operated by a stepping motor, the opening degree of which can be adjusted by drive control of the motor unit 102. That is, when the first refrigerant passage is intended to be opened in accordance with an operation state of the automotive air conditioner, the valve element 332 is displaced in the valve-opening direction with the rotor 172 being rotationally driven in one direction from the state illustrated in FIG. 7 (normal rotation), thereby making the first valve 305 to be opened, as illustrated in FIG. 8. That is, the valve actuating member 134 that rotates with the rotor 172 is moved downward by a screw mechanism, so that the valve element 332 is lowered, thereby making the valve element 332 to be displaced in the valve-opening direction. The valve element 332 is driven within a range between the fully-closed state illustrated in FIG. 7 and the fully-opened state illustrated in FIG. 8, thereby allowing an opening degree of the first valve 305 to be adjusted. As a result, the refrigerant introduced from the first inlet port 310 is delivered from the outlet port 314 after passing through the first valve 305.

In addition, when the second refrigerant passage is intended to be opened in accordance with an operation state of the automotive air conditioner, the valve element 332 is displaced in the valve-closing direction with the rotor 172 being rotationally driven in the other direction from the state illustrated in FIG. 7 (reverse rotation), thereby making the second valve 306 to be opened, as illustrated in FIG. 9. That is, the valve actuating member 134 that rotates with rotor 172 is lifted by the screw mechanism, so that the transmission rod 334 is raised, thereby making the valve element 130 to be displaced in the valve-opening direction. The valve element 130 is driven within a range between the fully-closed state illustrated in FIG. 7 and the fully-opened state illustrated in FIG. 9, thereby allowing an opening degree of the second valve 306 to be adjusted. At the time, the force, by which the valve element 332 is lowered, is no longer present with the transmission rod 334 being spaced apart therefrom, and accordingly the valve element 332 is seated on the valve seat 146 by the biasing force of the spring 256, thereby allowing a valve-closed state of the first valve 305 to be maintained. As a result, the refrigerant introduced from the second inlet port 312 is delivered from the outlet port 314 after passing through the second valve 306.

[Fourth Embodiment]

Figure 10:
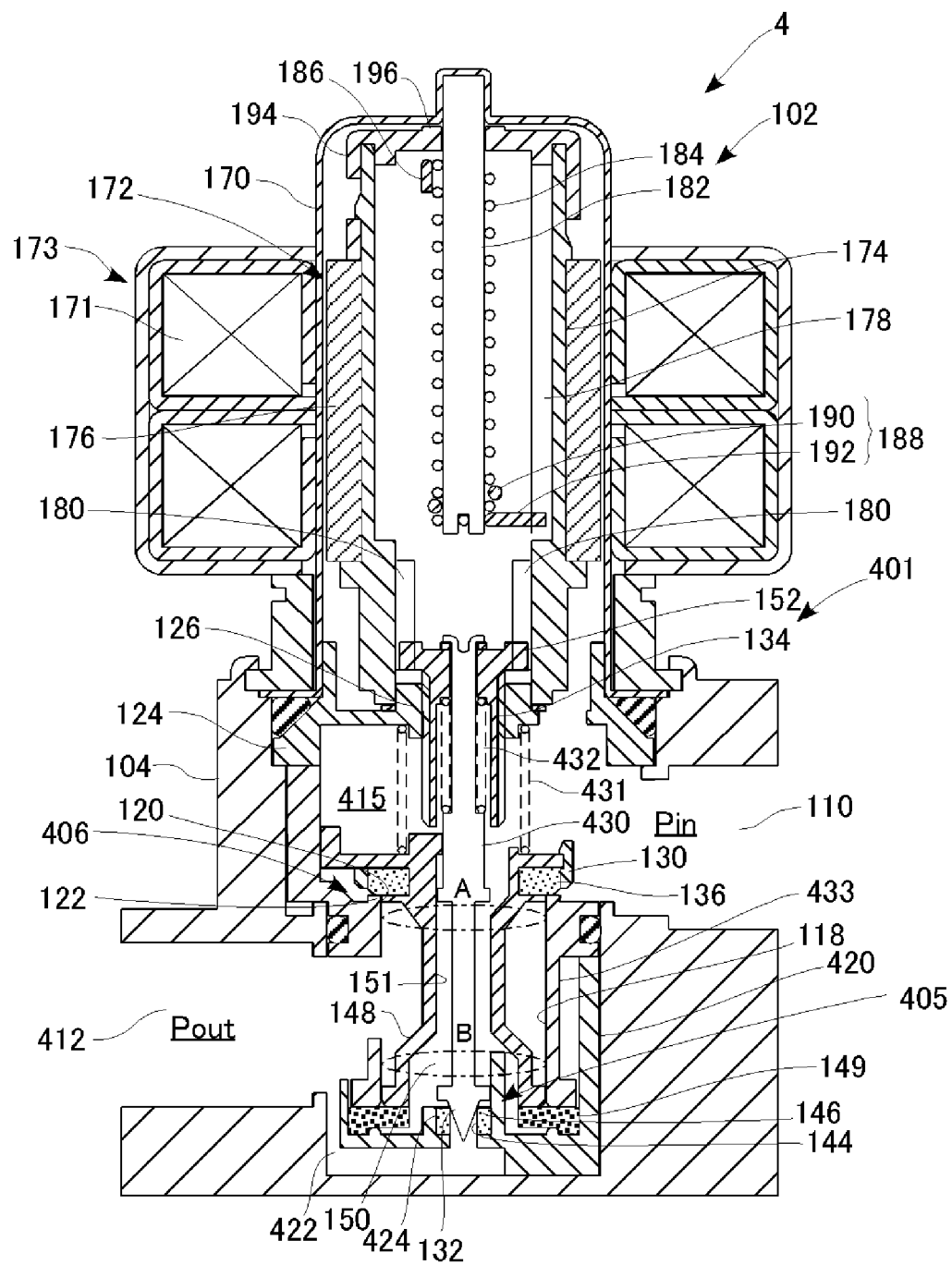
FIG. 10 is a sectional view illustrating a structure and an operation of a control valve according to Fourth Embodiment.
Figure 11:
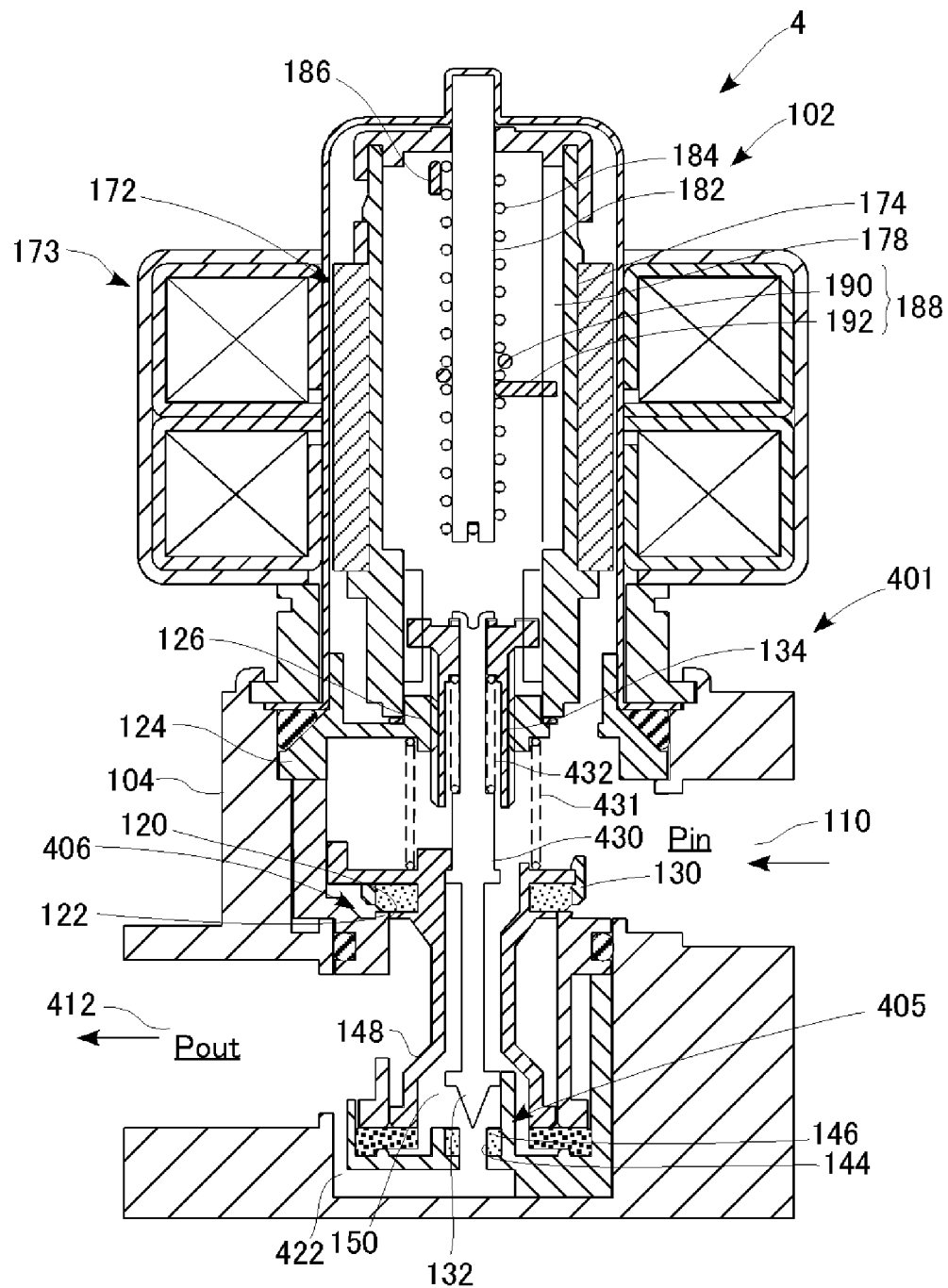
FIG. 11 is a sectional view illustrating the structure and an operation of the control valve according to Fourth Embodiment.
Figure 12:
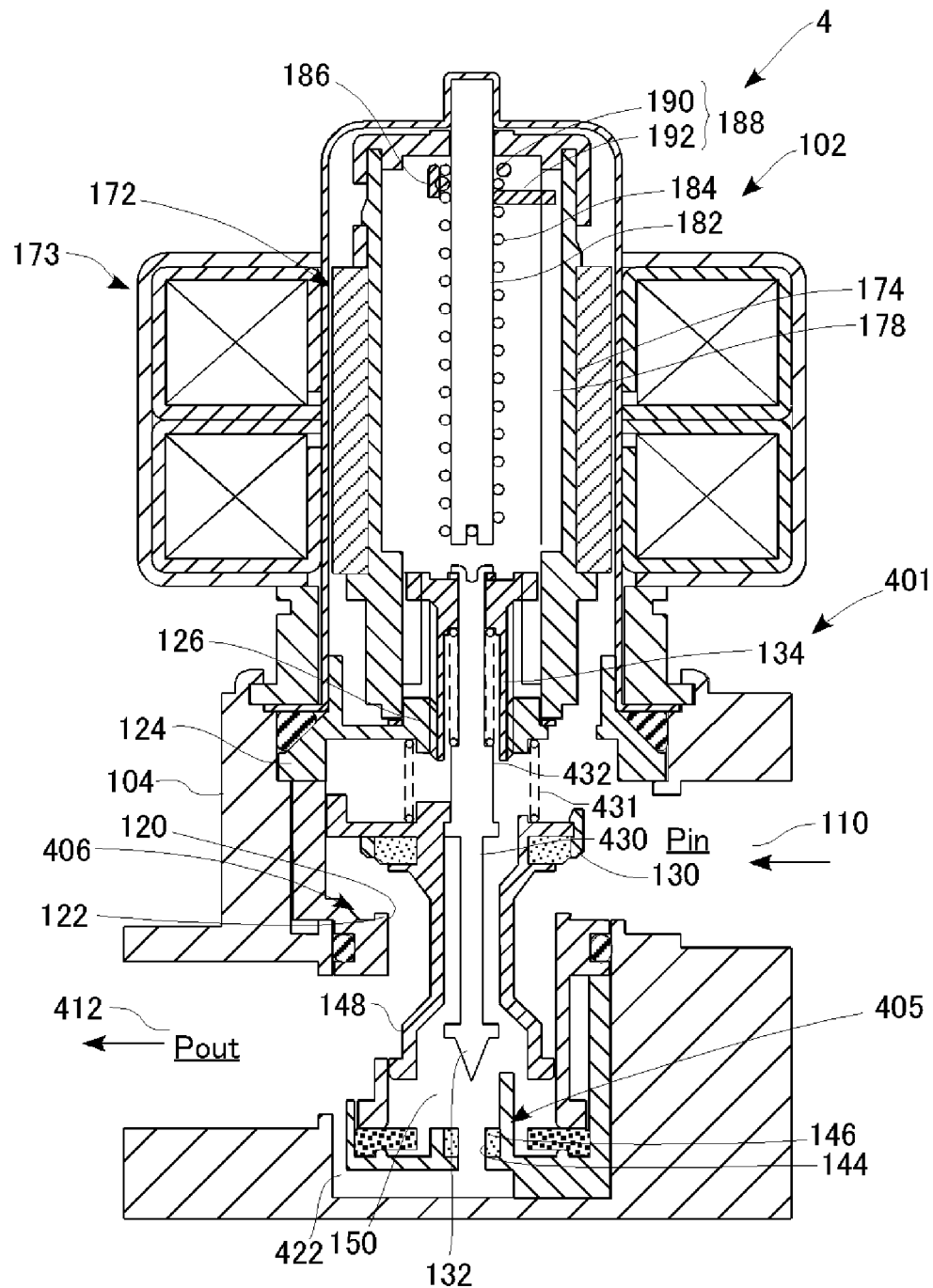
FIG. 12 is a sectional view illustrating the structure and an operation of the control valve according to Fourth Embodiment.

Subsequently, Fourth Embodiment of the present invention will be described. A control valve according to the present embodiment is different from that of First Embodiment with respect to the structure of a valve mechanism and the number of ports, but has the structures of other parts the same as those of the control valve of First Embodiment. Accordingly, parts having structures almost similar to those in First Embodiment will be denoted with like reference numerals, and descriptions thereof will be appropriately omitted. FIGS. 10 to 12 are sectional views each illustrating a structure and an operation of the control valve according to Fourth Embodiment.

The control valve 4 is provided at a predetermined position in a refrigerant circulation passage, so that a flow rate of the refrigerant flowing from an upstream passage to a downstream passage is adjusted. As illustrated in FIG. 10, the control valve 4 is formed by assembling a valve main body 401 and the motor unit 102. The control valve 4 is formed by coaxially housing, in the bottomed cylindrical body 104, a first valve 405 having a small aperture and a second valve 406 having a large aperture, and is formed as a proportional valve in which, when one of the above two valves is closed, an opening degree of the other valve is adjusted to a preset one.

The inlet port 110 is provided in one side portion of the body 104, and an outlet port 412 is provided in the other side portion thereof. The inlet port 110 communicates with the upstream passage and the outlet port 412 communicates with the downstream passage. The control valve 4 opens only the first valve 405 or both of the first valve 405 and the second valve 406 in accordance with an operation state of the automotive air conditioner.

A partition member 420 having a bottomed cylindrical shape and a partition member 433 having a stepped cylindrical shape are coaxially inserted into the body 104. The partition member 420 is fitted into the lower half portion of the body 104 to form a communication passage 422 with the body 104. A stepped hole, penetrating a bottom center of the partition member 420 in the axis line direction, is provided and a ring-shaped valve seat-forming member 424 is press-fitted into an upper end opening portion of the stepped hole. The valve hole 144 is formed by an inner circumferential portion of the valve seat-forming member 424, and the valve seat 146 is formed by the upper end opening edge of the valve hole 144. The first valve 405 is opened and closed with the valve element 132 touching and leaving the valve seat 146. A communication passage 422 communicates the valve hole 144 and the outlet port 412 together.

The partition member 433 is concentrically attached to the body 104 via a sealing member. The valve hole 120 is formed in a central portion of the partition member 433. The guide hole 118 is formed in a lower half portion of the partition member 433. The valve element 130, the valve element 132, the valve actuating member 134, and a transmission rod 430 are coaxially arranged inside the body 104. A female thread portion is provided on the inner circumferential surface of the bearing part 226 in the partition member 124 in the same way as in First Embodiment. The transmission rod 430 is provided integrally with the valve element 132 to slidably penetrate the valve element 130 and the communication passage 151 inside the partition part 148. The transmission rod 430 has, in an upper end portion and a central portion thereof, stoppers each extending radially outward. The transmission rod 430 can be displaced relatively with each of the valve actuating member 134 and the valve element 130, and a displacement relative with the valve actuating member 134 is regulated with the upper stopper being stopped by an upper surface of the valve actuating member 134. In addition, a displacement relative with the valve element 130 is regulated with the central stopper being stopped by an upper end portion of the valve element 130.

The valve element 130 is arranged in a pressure chamber 415 between the inlet port 110 and the valve hole 120 to adjust an opening degree of the second valve 406 by moving toward and away from the valve hole 120 from the upstream side. A spring 431 for biasing the valve element 130 in the valve-closing direction (which functions as a "biasing member") is interposed between the valve element 130 and the partition member 124. The valve element 132 is provided integrally with a lower end portion of the transmission rod 430 to touch and leave the valve seat 146 from the back-pressure chamber 150. A spring 432 for biasing the valve element 132 in the valve-closing direction (which functions as a "biasing member") is interposed between the transmission rod 430 and the valve actuating member 134. The back-pressure chamber 150 is formed by a space enclosed by the partition part 148 and the partition member 420. An upstream pressure $P_{in}$ introduced via the inlet port 110 is introduced into the back-pressure chamber 150 via the communication passage 151. The received-pressure adjusting member 149 is arranged between the partition members 420 and 433. Herein, the effective diameter A of the valve hole 120 and the effective diameter B of the guide hole 118 are also set to be equal to each other in the present embodiment. Accordingly, an influence of a refrigerant pressure, possibly acting on the valve element 130, is canceled.

The control valve 4 structured as stated above functions as a control valve operated by a stepping motor, the opening degree of which can be adjusted by drive control of the motor unit 102. That is, when the small aperture control is performed in accordance with an operation state of the automotive air conditioner, the valve element 132 is displaced in the valve-opening direction with the rotor 172 being rotationally driven in one direction from the state illustrated in FIG. 10 (normal rotation), thereby making the first valve 405 to be opened. That is, the valve element 132 is driven within a range between the fully-closed state illustrated in FIG. 10 and the fully-opened state illustrated in FIG. 11. In the present embodiment, the first valve 405 is in the fully-opened state from the valve-closed state of the first valve 405 after the rotor 172 rotates five times, and the valve element 132 is lifted by 2.5 mm from the valve seat 146 (0.5 mm per one rotation). Meanwhile, a valve opening degree (valve stroke) of the first valve 405 having a small aperture changes proportionally.

In addition, when the large aperture control is performed in accordance with an operation state of the automotive air conditioner, the rotor 172 is further rotated in the same direction from the fully-opened state illustrated in FIG. 11 (normal rotation). As a result, the valve element 130 is driven in the valve-opening direction by being raised with the transmission rod 430. At the time, the valve element 130 is driven within a range between the fully-closed state illustrated in FIG. 11 and the fully-opened state illustrated in FIG. 12. In the present embodiment, the second valve 406 is in the fully-opened state from the valve-closed state of the second valve 406 (from the fully-opened state of the first valve 405) after the rotor 172 rotates seven times, and the valve element 130 is lifted by 3.5 mm from the valve seat 122 (0.5 mm per one rotation). That is, the rotation stopper 188 is stopped by the stopper 186 at the top dead center, and accordingly, the rotation itself of the rotor 172 is stopped. Meanwhile, a valve opening degree (valve stroke) of the second valve 406 having a large aperture changes proportionally, as illustrated. Herein, when the rotor 172 is rotated in the opposite direction, the valve elements 130 and 132 move in the valve-closing direction in procedures opposite to the aforementioned ones. Because the number of rotations of the rotor 172 corresponds to the number of drive steps as a control command value, the controller can control the control valve 4 so as to have an arbitrary opening degree. As a result, the refrigerant introduced from the inlet port 110 is delivered from the outlet port 412 after passing through the first valve 405 and the second valve 406.

[Fifth Embodiment]

Figure 13:
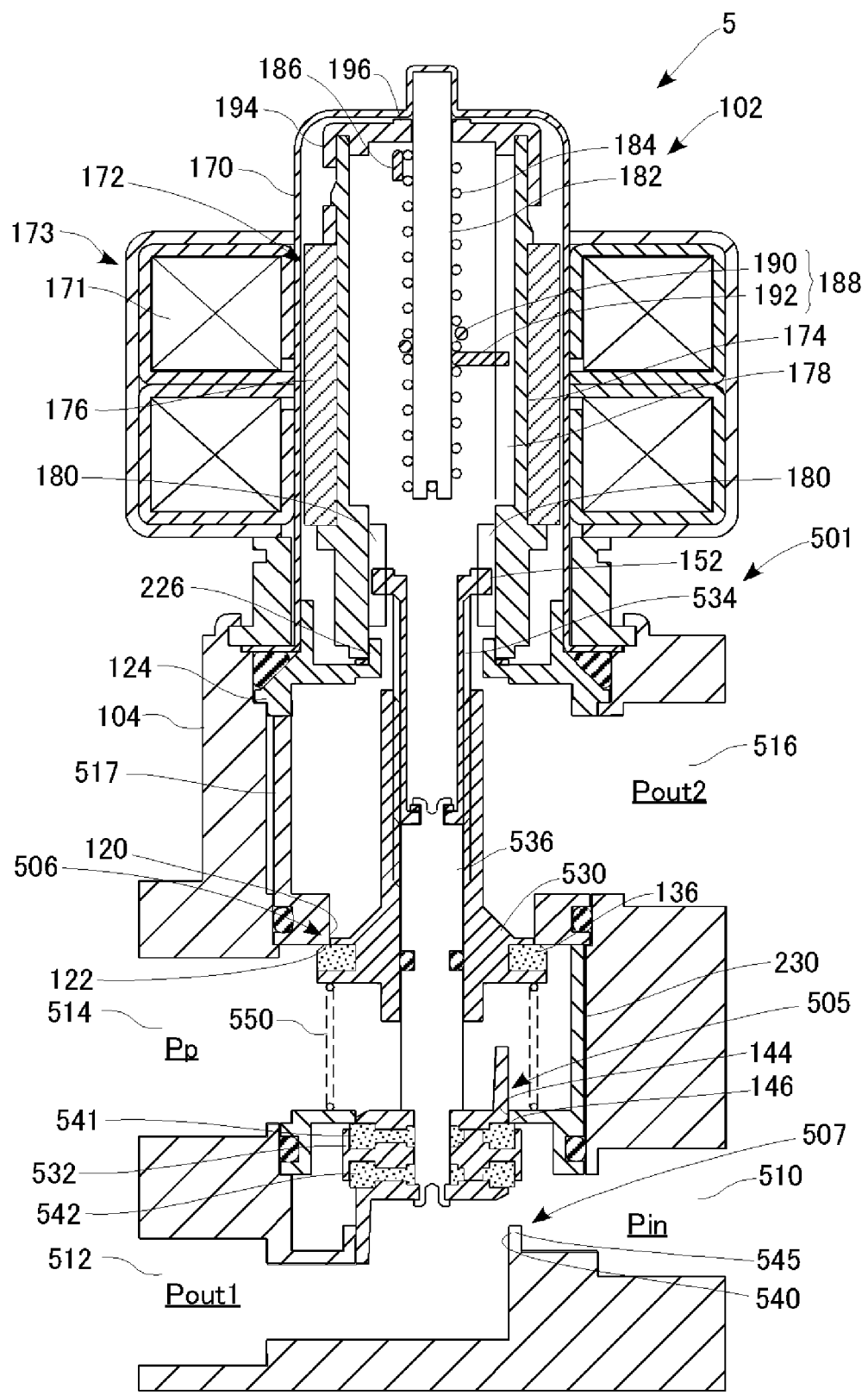
FIG. 13 is a sectional view illustrating a structure and an operation of a control valve according to Fifth Embodiment.
Figure 14:
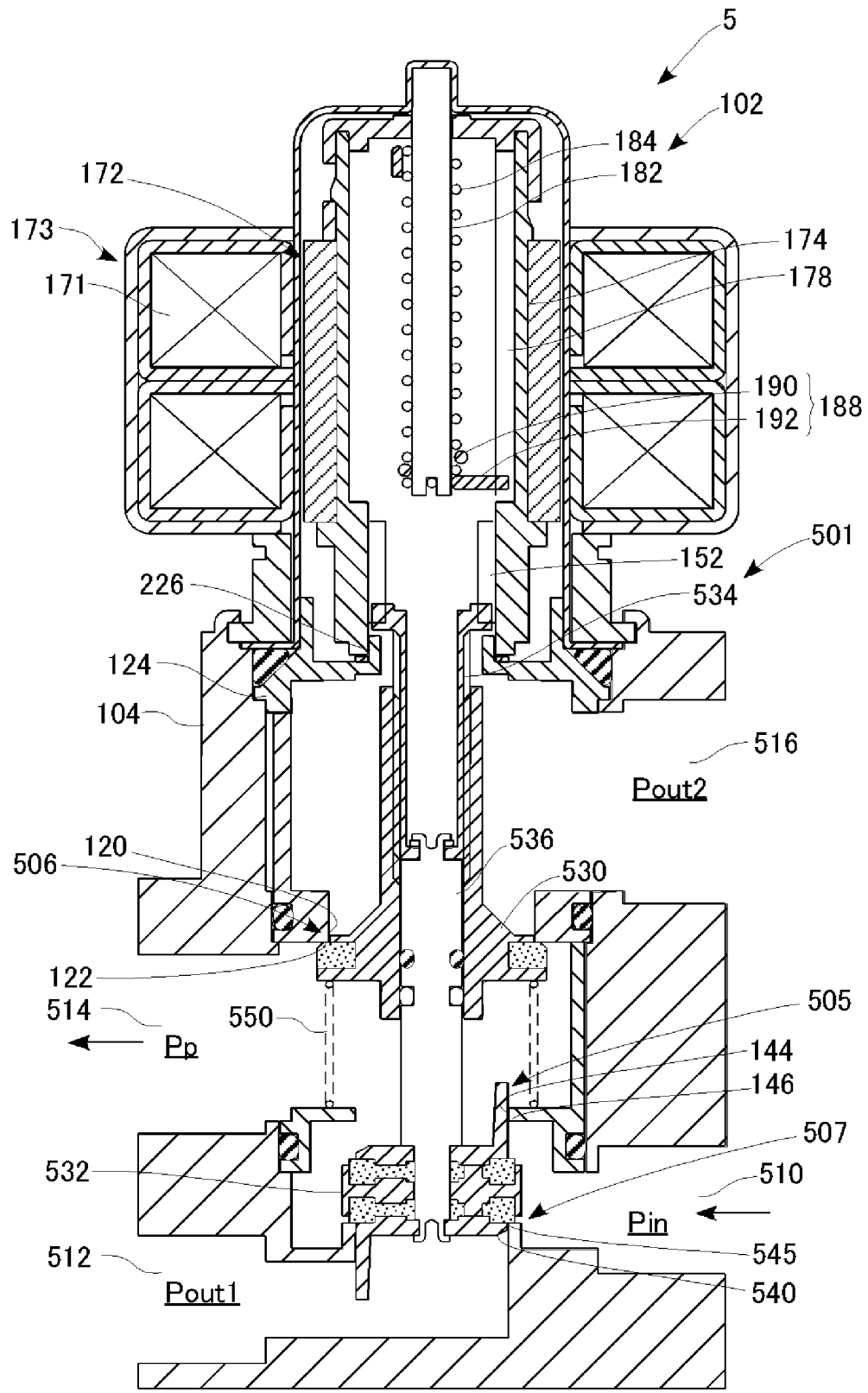
FIG. 14 is a sectional view illustrating the structure of an operation of the control valve according to Fifth Embodiment.
Figure 15:
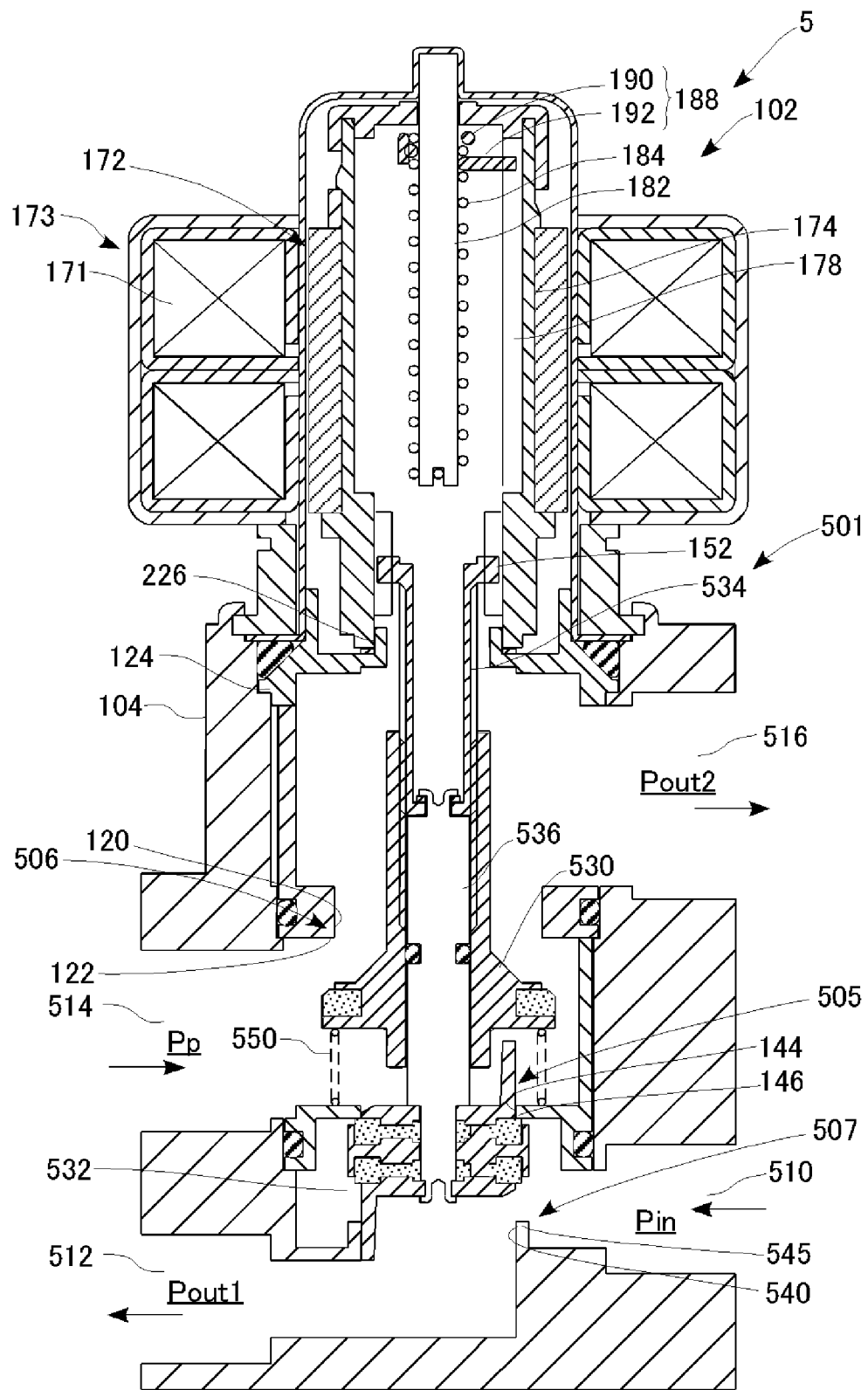
FIG. 15 is a sectional view illustrating the structure and an operation of the control valve according to Fifth Embodiment.

Subsequently, Fifth Embodiment of the present invention will be described. A control valve according to the present embodiment is different from that of Second Embodiment with respect to the structure of a valve mechanism and the arrangement of ports, but has the structures of other parts the same as those of the control valve of Second Embodiment. Accordingly, parts having structures almost similar to those in Second Embodiment will be denoted with like reference numerals, and descriptions thereof will be appropriately omitted. FIGS. 13 to 15 are sectional views each illustrating a structure and an operation of the control valve according to Fifth Embodiment.

The control valve 5 is provided at a connection point where a first passage, a second passage, a third passage, and a fourth passage, which form a refrigerant circulation passage, are connected together, so that a flow of a refrigerant flowing through each of the passages is switched and a flow rate thereof is adjusted. In the present embodiment, the first passage is an upstream passage, the second passage is a first downstream passage, the third passage is a commonly-used passage, and the fourth passage is a second downstream passage. The control valve 5 has a first valve 505, a second valve 506, and a third valve 507, and is a proportional valve in which an opening degree of each of the valves is adjusted to a preset one.

As illustrated in FIG. 13, the control valve 5 is formed by assembling a valve main body 501 and the motor unit 102. The valve main body 501 is formed by coaxially housing, in the body 104, the first valve 505, the second valve 506, and the third valve 507. An inlet port 510 and a second outlet port 516 are provided in one side portion of the body 104, and a first outlet port 512 and an inlet/outlet port 514 are provided in the other side portion thereof. The inlet port 510 communicates with the first passage, the first outlet port 512 communicates with the second passage, the inlet/outlet port 514 communicates with the third passage, and the second outlet port 516 communicates with the fourth passage.

A valve element 530, a commonly-used valve element 532, a valve actuating member 534, and a transmission rod 536 are coaxially arranged inside the body 104. In the present embodiment, the outer circumferential surface of the bearing part 226 in the partition member 124 functions as a plain bearing, but a female thread portion, as in First Embodiment, is not provided on the inner circumferential surface. On the other hand, a female thread portion is provided on an inner circumferential surface of an upper half portion of the valve element 530. A male thread portion is formed on an outer circumferential surface of the valve actuating member 534, which is screwed to the female thread portion of the valve element 530. An upper half portion of the transmission rod 536 is slidably inserted into the valve element 530, and an upper end portion of the transmission rod 536 is connected to the valve actuating member 534.

A partition member 517 is arranged in the upper half portion of the body 104, and the valve hole 120 is formed in a lower portion of the partition member 517. The partition member 230 is arranged in the lower half portion of the body 104, and the valve hole 144 is formed in the lower portion of the partition member 230. Further, a valve hole 540 is provided in the lower portion of the body 104, and a valve seat 545 is formed by an upper end opening edge of the valve hole 540. A spring 550 for biasing the valve element 530 in the valve-closing direction (which functions as a "biasing member") is interposed between the valve element 530 and the partition member 230. The valve element 530 opens and closes the second valve 506 by touching and leaving the valve seat 122 from the upstream side.

The commonly-used valve element 532 is coaxially fixed to a lower end portion of the transmission rod 536. The commonly-used valve element 532 has a main body having a stepped cylinder shape, and is formed such that an upper end portion thereof can contact and leave the valve hole 144 and a lower end portion thereof can contact and leave the valve hole 540. A plurality of legs (only one of them is illustrated in FIG. 13), each of which is slidably supported by the valve hole 144, are provided, in an extended manner, in the upper end portion of the commonly-used valve element 532. In addition, a plurality of legs (only one of them is illustrated in FIG. 13), each of which is slidably supported by the valve hole 540, are provided, in an extended manner, in the lower end portion of the commonly-used valve element 532.

A first valve member 541 is fitted around the upper end portion of the commonly-used valve element 532, and a second valve member 542 is fitted around the lower end portion thereof. The first valve member 541 is made of an annular elastic body (rubber in the present embodiment), and opens and closes the first valve 505 by touching and leaving the valve seat 146. The second valve member 542 is made of an annular elastic body (rubber in the present embodiment), and opens and closes the third valve 507 by touching and leaving the valve seat 545.

The control valve 5 structured as stated above functions as a control valve operated by a stepping motor, the opening degree of which can be adjusted by drive control of the motor unit 102. That is, when the first refrigerant passage is intended to be opened in accordance with an operation state of the automotive air conditioner, the control valve 5 is in the state illustrated in FIG. 13. At the time, the third valve 507 is opened, while the first valve 505 and the second valve 506 are closed. As a result, the refrigerant introduced from the inlet port 510 is delivered from the first outlet port 512 after passing through the third valve 507.

In addition, when the second refrigerant passage is intended to be opened in accordance with an operation state of the automotive air conditioner, the valve actuating member 534 is displaced relatively downward with respect to the valve element 530 with the rotor 172 being rotationally driven in one direction from the state illustrated in FIG. 13 (normal rotation). At the time, the valve element 530 is in a state in which it cannot be displaced upward because the second valve 206 is closed with the valve element 530 being seated on the valve seat 122, and hence the valve actuating member 534 is displaced downward, thereby making the commonly-used valve element 532 to be lowered. The commonly-used valve element 532 is driven, from the state illustrated in FIG. 13, in a direction in which the first valve 505 is opened (a direction in which the third valve 507 is opened), as illustrated in FIG. 14, thereby allowing opening degrees of the first valve 505 and the third valve 507 to be adjusted. At the time, when the third valve 507 is closed, the refrigerant introduced from the inlet port 510 is delivered from the inlet/outlet port 514 after passing through the first valve 505.

In addition, when the third refrigerant passage is intended to be opened in accordance with an operation state of the automotive air conditioner, the valve actuating member 534 is displaced relatively upward with respect to the valve element 530 with the rotor 172 being rotationally driven in the other direction from the state illustrated in FIG. 13 (reverse rotation). At the time, the commonly-used valve element 532 is lifted by the biasing force of the spring 550, thereby allowing a valve-closed state of the first valve 505 to be maintained. On the other hand, the valve actuating member 534 is displaced in a direction in which it is spaced apart from the valve element 530. The valve element 530 is driven within a range between the fully-closed illustrated in FIG. 13 and the fully-opened state illustrated in FIG. 15, thereby allowing an opening degree of the second valve 506 to be adjusted.

Preferred embodiments of the present invention have been described above, but it is needless to say that the invention should not be limited to the specific embodiments and various variations may be made within the scope of the technical idea of the invention.

In each of the aforementioned embodiments, an example has been described, in which each of the guide part 184 of the shaft 182 in the motor unit 102 and the engagement part 190 of the rotation stopper 188 is formed into a spiral shape by a coil-shaped member. In a variation, another screw mechanism may be adopted, in which, for example, the guide part 184 of the shaft 182 has a male thread portion and the engagement part 190 of the rotation stopper 188 has a female thread portion. That is, a mechanism for converting a rotational movement into a translational movement by both the parts has only to be formed.

In the aforementioned embodiments, an automotive air conditioner according to the present invention has been applied to an electric car, but it is needless to say that the air conditioner can be provided to a car in which an internal-combustion engine is mounted and a hybrid car in which an internal-combustion engine and an electric motor are mounted. An example, in which an electrically-driven compressor is adopted as a compressor, has been described in the aforementioned embodiments, but a variable displacement compressor, which performs variable displacement by using rotation of an engine, can also be adopted.

What is claimed is:

1. A control valve driven by a stepping motor, comprising:
a body having an inlet port for introducing a refrigerant from an upstream side, an outlet port for delivering the refrigerant toward a downstream side, and a valve hole for communicating the inlet port and the outlet port together;
a valve element configured to open and close a valve section by contacting and leaving the valve hole;
a stepping motor including a rotor for driving the valve element in directions in which the valve section is opened and closed;
a valve actuating member configured to rotate with the rotor and to drive the valve element in the directions in which the valve section is opened and closed, by converting a rotational movement around an axis line of the rotor into a translational movement of the valve actuating member in an axis line direction;
a shaft that is fixed to the body and extends in the axis line direction of the rotor;
a first guide part having a spiral shape that is disposed, in an extended manner, on an outer circumferential surface of the shaft and in an axis line direction of the shaft; and
a rotation stopper that has both an engagement part engaged along the first guide part and a power transmission part supported by the rotor, and that is displaced in the axis line direction of the shaft with the rotation of the rotor, and that regulates the rotation of the rotor with the power transmission part being respectively stopped by one end side and the other end side of the shaft,
wherein the valve actuating member is supported by the rotor so as to be capable of making a translational movement of the valve actuating member in the axis line direction with respect to the rotor, while a rotational movement with respect to the rotor is regulated,
wherein the rotor is of a hollow shape such that the rotor has bearing parts on one end side and the other end side of the rotor, a second guide part, which is engaged with the power transmission part, is disposed on an inner circumferential surface of the rotor, and the rotor rotates in a state in which the rotor is held at a predetermined position along the axis line direction in the body, and
wherein the shaft and the first guide part are extended in an internal space of the rotor, so that the rotation stopper is displaced in the internal space.

2. The control valve according to claim 1, wherein an actuation conversion mechanism, by which a rotational movement of the rotor is converted into a translational movement of the valve actuating member, is disposed by a screw mechanism in which a female thread portion provided on an inner circumferential surface of the body and a male thread portion provided on an outer circumferential surface of the valve actuating member are screwed together.

3. The control valve according to claim 2 comprising:
a first valve hole, being the valve hole, disposed in the body;

a second valve hole disposed in the body and coaxially with the first valve hole;

a first valve element, being the valve element, configured to open and close a first valve section, being the valve section, by contacting and leaving the first valve hole; and a second valve element configured to open and close a second valve section by contacting and leaving the second valve hole, wherein the first valve element and the second valve element are respectively driven with the stepping motor being used as a commonly-used actuator.

4. The control valve according to claim 3 comprising:

a biasing member that is provided between the first valve element and the second valve element to bias both of the valve elements in the valve-closing direction, wherein the female thread portion is provided in the body, and wherein a biasing force of the biasing member is changed with the valve actuating member being displaced in the axis line direction in accordance with the rotation of the rotor.

5. The control valve according to claim 3 comprising:

a first biasing member configured to bias the second valve element in the valve-opening direction; and a second biasing member configured to bias the first valve element in the valve-closing direction, wherein the female thread portion is provided in the second valve element, and wherein the valve actuating member is structured to be capable of being connected to the first valve element by penetrating the second valve element, and wherein when the rotor rotates in one direction, the second valve element is displaced in the valve-closing direction, and when the rotor further rotates in the one direction in a valve-closed state of the second valve element, the first valve element is driven in the valve-opening direction by the valve actuating member.

6. The control valve according to claim 3 comprising:

a first biasing member configured to bias the second valve element in the valve-closing direction; and a second biasing member configured to bias the first valve element in the valve-closing direction, wherein the female thread portion is provided in the body, and wherein the valve actuating member is structured to be capable of being connected to the first valve element by penetrating the second valve element, and wherein when the rotor rotates in one direction, the first valve element is driven in the valve-opening direction by the valve actuating member, and when the rotor rotates in the other direction, the first valve element is driven in the valve-closing direction, and when the rotor further rotates in the other direction in a valve-closed state of the first valve element, the second valve element is lifted by the valve actuating member, thereby making the second valve section to be opened.

7. The control valve according to claim 3, wherein when the first valve section is in a fully-opened state with the first valve element being displaced because the rotor rotates in one direction, the second valve element is lifted by the first valve element with the second valve element being engaged with the first valve element and with the rotor further rotating in the same direction, thereby making the second valve section to be opened.

8. The control valve according to claim 3 comprising:

a third valve hole provided to be opposite to the second valve hole with respect to the first valve hole and to be coaxial with the first valve hole and the second valve hole;

a third valve element that can open and close a third valve section by contacting and leaving the third valve hole;

a commonly-used valve element that is arranged between the first valve hole and the third valve hole, in which the first valve element and the third valve element are provided integrally with each other; and a biasing member configured to bias the second valve element in the valve-closing direction, wherein the female thread portion is provided in the second valve element, and wherein the valve actuating member is connected to the commonly-used valve element by penetrating the second valve element, and wherein when the rotor rotates in one direction, the second valve element is displaced in the valve-closing direction, and when the rotor further rotates in the one direction in a valve-closed state of the second valve element, the commonly-used valve element is driven, by the valve actuating member, in a direction in which the first valve element is opened and in a direction in which the third valve element is closed, and wherein when the rotor rotates in the other direction, the commonly-used valve element is driven in a direction in which the first valve element is closed and in a direction in which the third valve element is opened, and when the rotor is further rotates in the other direction in a valve-closed state of the first valve element, the second valve element is driven in the valve-opening direction by the valve actuating member.

* * * * *